(12) United States Patent
Goh et al.

(10) Patent No.: US 9,165,234 B2
(45) Date of Patent: Oct. 20, 2015

(54) RADIO FREQUENCY IDENTIFICATION TAG ASSEMBLY WITH A FIRST TAG IDENTITY AND A SECOND TAG IDENTITY THAT ARE STORED IN A SECOND TAG MEMORY PORTION

(71) Applicant: Cadi Scientific Pte Ltd, Singapore (SG)

(72) Inventors: Zenton Goh, Singapore (SG); Sian Sheng Neo, Singapore (SG); Hon Cheong Ng, Singapore (SG); Soh Min Lim, Singapore (SG)

(73) Assignee: CADI SCIENTIFIC PTE LTD, Singapore (SG)

( * ) Notice: Subject to any disclaimer, the term of this patent is extended or adjusted under 35 U.S.C. 154(b) by 146 days.

(21) Appl. No.: 14/081,571

(22) Filed: Nov. 15, 2013

(65) Prior Publication Data
US 2014/0070011 A1 Mar. 13, 2014

Related U.S. Application Data

(62) Division of application No. 13/054,930, filed as application No. PCT/SG2008/000267 on Jul. 23, 2008, now Pat. No. 8,610,545.

(51) Int. Cl.
*G08B 21/00* (2006.01)
*G06K 19/07* (2006.01)
(Continued)

(52) U.S. Cl.
CPC ............ *G06K 19/0723* (2013.01); *G01S 5/0252* (2013.01); *G01S 2013/466* (2013.01)

(58) Field of Classification Search
CPC ............ G01S 2013/466; G01S 5/0252; G06K 19/0723

USPC .................................................... 340/10, 572
See application file for complete search history.

(56) References Cited

U.S. PATENT DOCUMENTS 5,461,385 A * 10/1995 Armstrong ...................... 342/42
6,405,102 B1 6/2002 Swartz et al.
(Continued)

FOREIGN PATENT DOCUMENTS

| CN | 1672060 A | 9/2005 |
|---|---|---|
| JP | 9-281208 A | 10/1997 |

(Continued)

*Primary Examiner* — Mark Rushing
(74) *Attorney, Agent, or Firm* — Hultquist, PLLC; Steven J. Hultquist; Mary B. Grant

(57) ABSTRACT

According to one embodiment of the present invention, a method for determining the location of a subject is provided. The method includes receiving, by a first set of receivers out of a plurality of receivers, a first signal from a radio frequency identification tag being assigned to the subject, wherein the radio frequency identification tag has assigned a radio frequency identification tag identity; receiving, by a second set of receivers out of a plurality of receivers, a second signal from the radio frequency identification tag, the second signal being different from the first signal, wherein the second set of receivers is different from the first set of receivers; computing a location score based on an information about the first signal, wherein the information about the first signal is included in the first signal and on the first set of receivers, and further based on an information about the second signal, wherein the information about the second signal is included in the second signal and on the second set of receivers; and determining the location of the subject based on the location score. A system for determining the location of a subject is also provided. A radio frequency identification tag assembly is also provided.

7 Claims, 21 Drawing Sheets

(51) Int. Cl.
*G01S 5/02* (2010.01)
*G01S 13/46* (2006.01)

(56) References Cited

U.S. PATENT DOCUMENTS

| | | |
|---|---|---|
| 8,610,545 B2 | 12/2013 | Goh et al. |
| 2004/0027243 A1 | 2/2004 | Carrender |
| 2005/0035873 A1* | 2/2005 | Kimura .................... 340/825.72 |
| 2005/0206555 A1 | 9/2005 | Bridgelall et al. |
| 2006/0071790 A1 | 4/2006 | Duron et al. |
| 2006/0108421 A1 | 5/2006 | Becker et al. |
| 2006/0208881 A1* | 9/2006 | Suzuki .................... 340/539.27 |
| 2006/0238341 A1 | 10/2006 | Commagnac et al. |
| 2007/0159338 A1 | 7/2007 | Beber et al. |
| 2007/0200680 A1 | 8/2007 | Colby |
| 2008/0001723 A1 | 1/2008 | Schuessler |
| 2008/0030324 A1* | 2/2008 | Bekritsky et al. ........ 340/539.22 |
| 2008/0048869 A1 | 2/2008 | Wang et al. |
| 2008/0143482 A1 | 6/2008 | Shoarinejad et al. |
| 2009/0140841 A1 | 6/2009 | Meyer |
| 2010/0259367 A1* | 10/2010 | Kung ......................... 340/10.3 |

FOREIGN PATENT DOCUMENTS

| | | |
|---|---|---|
| JP | 2006-10502 A | 1/2006 |
| JP | 2006-118882 A | 5/2006 |
| JP | 2009-44649 A | 2/2009 |
| WO | 2006092858 A1 | 9/2006 |
| WO | 2007110964 A1 | 10/2007 |
| WO | 2009086252 A1 | 7/2009 |

* cited by examiner

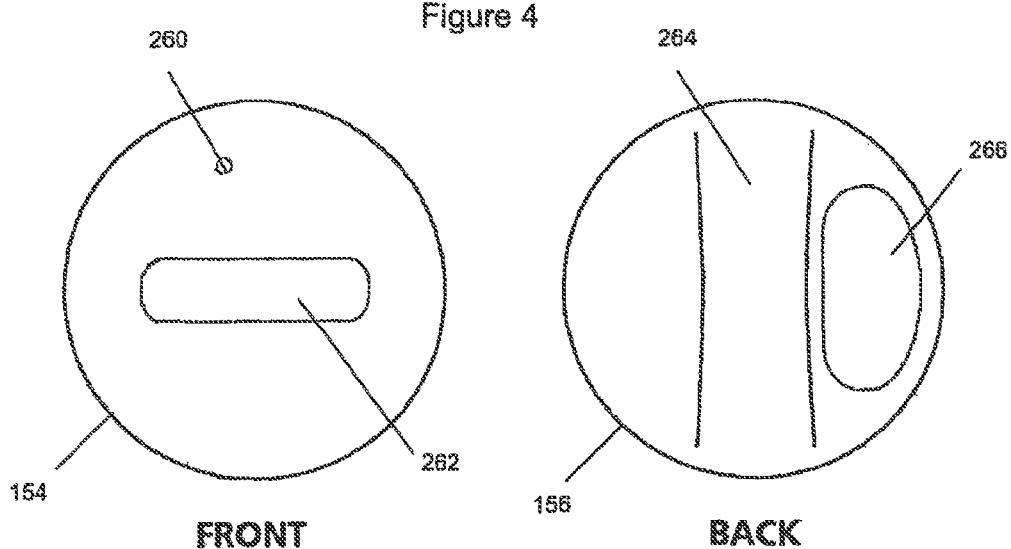
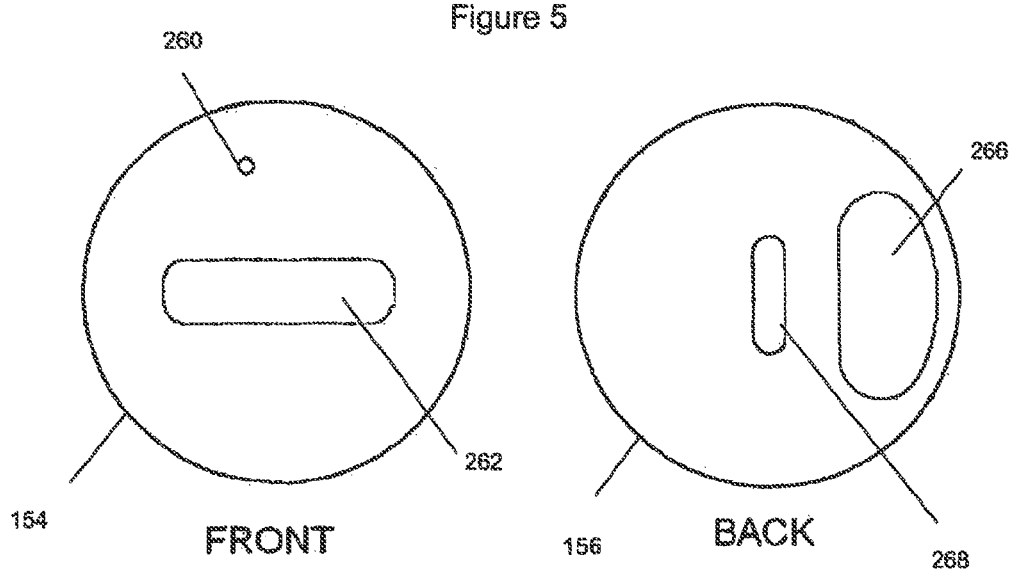

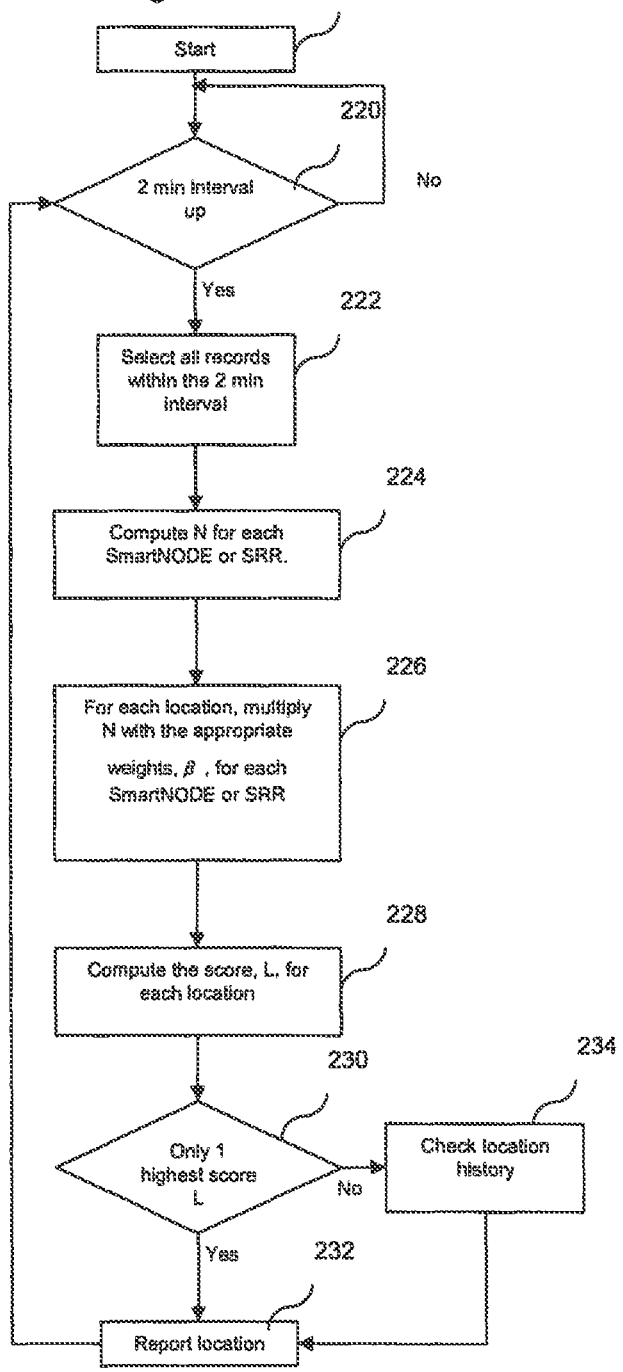

RADIO FREQUENCY IDENTIFICATION TAG ASSEMBLY WITH A FIRST TAG IDENTITY AND A SECOND TAG IDENTITY THAT ARE STORED IN A SECOND TAG MEMORY PORTION

CROSS-REFERENCE TO RELATED APPLICATIONS

This application is a divisional application under U.S.C. §120 of U.S. Ser. No. 13/054,930 filed Jan. 19, 2011, which was the U.S. National Stage under the provisions of 35 U.S.C. §371 of International Patent Application No. PCT/SG08/00267 filed Jul. 23, 2008. The disclosures of the parent U.S. application and the international patent application are hereby incorporated herein by reference, in their respective entireties, for all purposes.

FIELD OF INVENTION

The present invention relates generally to a method and a system for determining the location identity of a subject, and a radio frequency identification tag assembly.

BACKGROUND OF INVENTION

A location tracking system is used for tracking a location of a person or an asset within an area, such as a hospital, a logistic hub for example. Current technologies used to implement a location tracking system involve the use of a signal timing analysis such as a Global Positioning System (GPS) or having a network of receivers to detect a beacon signal.

The GPS is normally used for providing location data in open areas rather than in an indoor environment such as an interior of a building. In addition, hardware required for the GPS implementation is relatively costly and therefore may increase the cost of implementation.

An indoor tracking environment can instead be covered by a network of radio frequency (RF) receivers. Personnel and assets are attached with mobile RF transmitters which transmit beacon signals. Trilateration or triangulation, based on Time of Arrival (TOA) or Received Signal Strength Indicator (RSSI), can then be used to obtain the location of the tracked personnel or asset. Such methods are computation intensive and are therefore also not desirable.

Infrared receivers and transmitters can be used in place of RF receivers and transmitters. Infrared signals provide a very good room based localization as infrared signals cannot penetrate through walls. However, the infrared transmitter can be easily obscured and this will result in the loss of the beacon signal.

Therefore, there is still a need for an improved location tracking system and method which can reduce the manpower, time and resources required to keep track of personnel and assets.

SUMMARY OF INVENTION

According to one embodiment of the present invention, a method for determining the location of a subject is provided. The method includes receiving, by a first set of receivers out of a plurality of receivers, a first signal from a radio frequency identification tag being assigned to the subject, wherein the radio frequency identification tag has assigned a radio frequency identification tag identity; receiving, by a second set of receivers out of a plurality of receivers, a second signal from the radio frequency identification tag, the second signal being different from the first signal, wherein the second set of receivers is different from the first set of receivers; computing a location score based on an information about the first signal, wherein the information about the first signal is included in the first signal and on the first set of receivers, and further based on an information about the second signal, wherein the information about the second signal is included in the second signal and on the second set of receivers; and determining the location of the subject based on the location score.

According to one embodiment of the present invention, a system for determining the location of a subject is provided. The system includes a first set of receivers out of a plurality of receivers for receiving a first signal from a radio frequency identification tag being assigned to the subject, wherein the radio frequency identification tag has assigned a radio frequency identification tag identity; a second set of receivers out of a plurality of receivers for receiving a second signal from the radio frequency identification tag, the second signal being different from the first signal, wherein the second set of receivers is different from the first set of receivers; a computing unit for computing a location score based on an information about the first signal, wherein the information about the first signal is included in the first signal and on the first set of receivers, and further based on an information about the second signal, wherein the information about the second signal is included in the second signal and on the second set of receivers; and a determining unit for determining the location of the subject based on the location score.

According to one embodiment of the present invention, a radio frequency identification tag assembly is provided. The radio frequency identification tag assembly includes a first tag, the first tag having a first tag identity; a second tag, the second tag having a second tag identity and a second tag memory portion; wherein the first tag identity and the second tag identity are stored in the second tag memory portion of the second tag.

According to one embodiment of the present invention, a radio frequency identification tag assembly is provided. The radio frequency identification tag assembly includes a radio frequency identification circuit; a normally closed switch connected to the radio frequency identification circuit, wherein the normally closed switch is configured such that when it is subjected to a magnetic field environment, the radio frequency identification circuit is electrically disconnected from a power supply and when it is out of the magnetic field environment, the radio frequency identification circuit is electrically connected to the power supply.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 show respective front and back views of a radio frequency identification tag assembly according to one embodiment of the present invention;

FIG. 5 show respective front and back views of a radio frequency identification tag assembly according to a further embodiment of the present invention;

FIG. 11 shows a flowchart of a method of tracking a location identity of a subject according to one embodiment of the present invention;

DESCRIPTION

Figure 1:
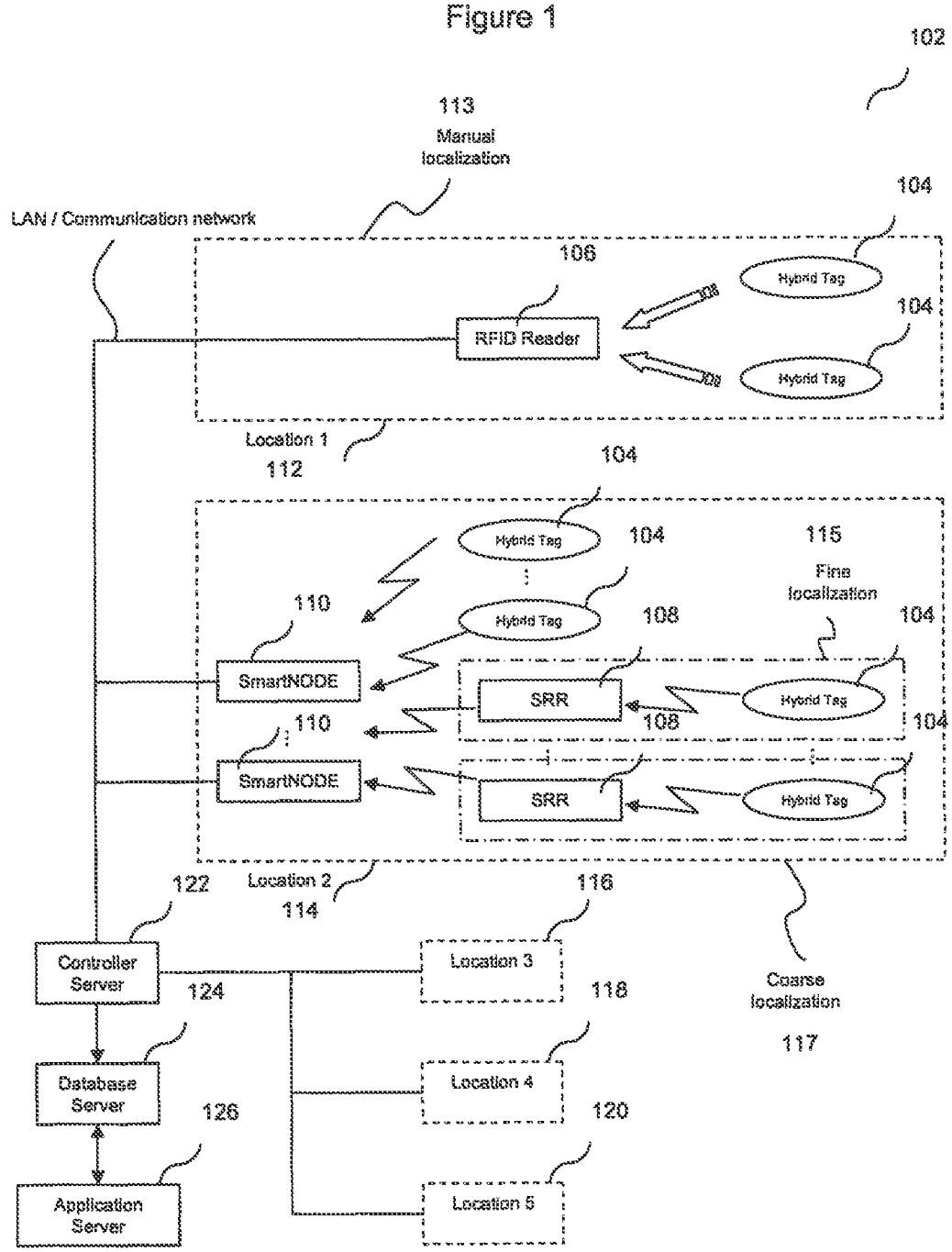
FIG. 1 shows a block diagram of a system for tracking a location identity of a subject according to one embodiment of the present invention.

FIG. 1 shows a block diagram of a system for tracking a location identity of a subject according to one embodiment of the present invention. The system 102 includes two radio frequency identification (RFID) tag assemblies 104 and a RFID tag reader 106 positioned in a first location 112. The system 102 further includes a plurality of RFID tag assemblies 104, two fine localization receivers 108 and two coarse localization receivers 110 positioned in a second location 114. The system 102 also includes a controller server 122, a database server 124 and an application server 126. The system 102 also includes further locations, a third location 116, a fourth location 118 and a fifth location 120.

The RFID tag reader 106 provides for a manual localization zone 113 in the first location 112. The manual localization zone 113 extends across the entire first location 112 in order to provide adequate coverage and is termed as such because the zone is resultant from the manual reading of the RFID tag assembly 104. Each of the fine localization receivers 108 provides for a fine localization zone 115 within the second location 114 and each of the coarse localization receivers 110 provides for a coarse localization zone 117 in the second location 114. The coarse localization 117 may extend across the entire second location 114 in order to provide adequate coverage. The system 102 may be termed the "SmartSense Location Tracking System".

Each of the RFID tag assembly 104 may be termed a "Hybrid Tag". Each Hybrid Tag 104 may include a passive RFID tag and/or an active RFID tag. Each Hybrid Tag 104 may be attached to a subject, for example a person or an object. Each Hybrid Tag 104 includes a (system or worldwide) unique identity (ID), and this unique ID will be associated with the person or object that the Hybrid Tag 104 is attached to. Each Hybrid Tag 104 will periodically transmit its ID through radio frequency (RF) means.

Each of the coarse localization receiver 110, which may be termed as a "SmartNODE", has a relatively wide coverage area or localization zone and each coarse localization receiver 110 is used to provide a coarse localization of the Hybrid Tag 104. If a SmartNODE 110 receives the ID of a Hybrid Tag 104, then the Hybrid Tag 104 must be within the reception range of the SmartNODE 110 and therefore identifying the Hybrid Tag 104 to be within a pre-defined coarse localization zone.

To further provide a more specific location of the Hybrid Tag 104, at least one fine localization receiver 108, each of which may be termed as a "Short Range receiver (SRR)" may be used. The SRRs 108 works on the same principle as the SmartNODEs 110. Each SRR 108 has a smaller coverage area or localization zone as compared to each SmartNODE 110, therefore, the SRR 108 will provide a finer localization of the Hybrid Tag 104.

The SmartNODEs 110 and SRRs 108 may be grouped together and associated with at least one location identity (ID) based on the location or location identity the receivers represent. A plurality of SmartNODEs 110 and SRRs 108 are distributed across a location ID. In one embodiment, the entire location may be covered by at least one SmartNODE 110 or one SRR 108. If the ID of a Hybrid Tag 104 is received by any of the SmartNODEs 110 or SRRs 108, the Hybrid Tag 104 must be within the location.

Tolerance has to be given for the location provided by the above RF tracking methods. When pinpoint accuracy is required, the location of a Hybrid Tag 104 is manually updated using one of the plurality of RFID tag readers 106. This is considered pinpoint accuracy as the system user has to be physically co-located with the tracked person or object in order to read the ID using one of the plurality of RFID tag readers 106, which is typically a passive RFID tag reader.

The SmartNODEs 110 and RFID tag readers 106 are respectively connected to a local area network (LAN). The data received from the respective SmartNODEs 110 and RFID tag readers 106 may be sent through the network to the controller server 122. The controller server 122 will then store the data in the database server 124. The application server 126 will generate a location of each Hybrid Tag 104 using a software termed a "SmartTRAC" algorithm using the data stored in the database server 124.

In one embodiment, the SRRs 108 may relay received data through RF means to the SmartNODEs 110, which will in turn be sent to the controller server 122.

Figure 2:
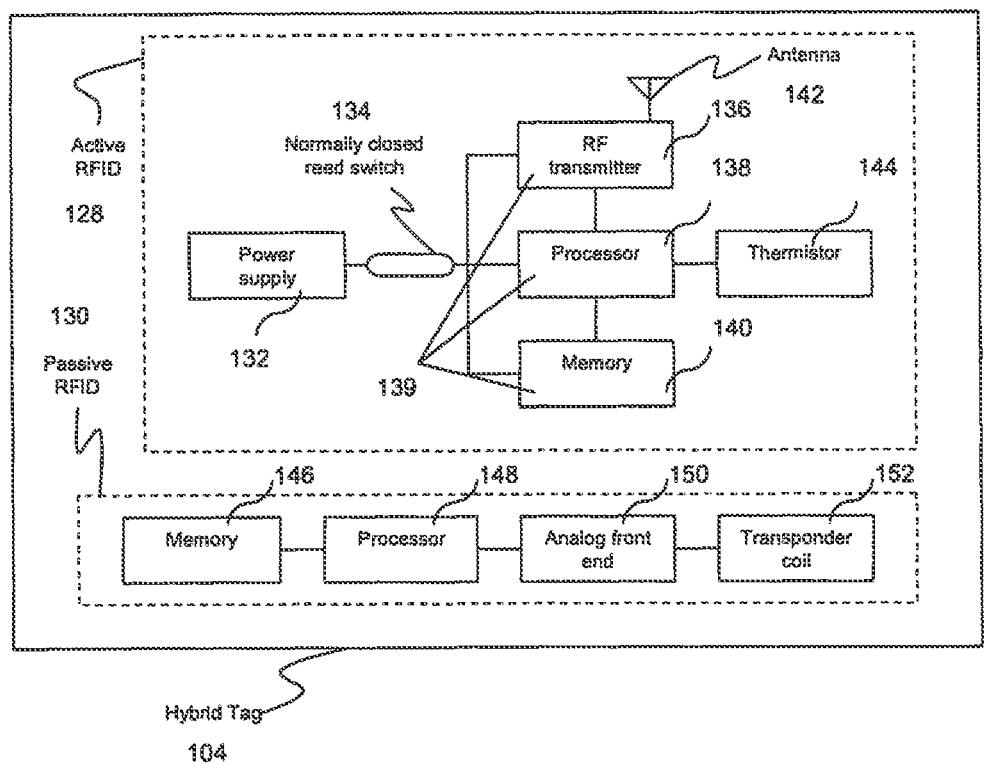
FIG. 2 shows a block diagram of a radio frequency identification tag assembly according to one embodiment of the present invention.

FIG. 2 shows a block diagram of a radio frequency identification tag assembly according to one embodiment of the present invention. The RFID tag assembly or Hybrid Tag 104 includes an active RFID tag portion 128 and a passive RFID tag portion 130. The active RFID tag portion 128 includes a power supply unit 132, a normally closed (NC) reed switch 134, a RF transmitter 136, an active RFID processor 138, an active RFID memory portion 140, an antenna 142 and a thermistor 144. The passive RFID tag portion 130 includes a passive RFID memory portion 146, a passive RFID processor 148, an analog front end 150 and a transponder coil 152.

In relation to the active RFID tag portion 128, the power supply unit 132 may be a battery component and may be used to power the active RFID tag portion 128. The normally closed reed switch 134 may include an inbuilt biasing magnet which cause the switch to be closed under normal condition. A magnetic field has to be brought close to counter the effect of the biasing magnet so as to open the switch. An example of the normally closed reed switch 134 is the R-5B-S reed sensor from RRE India limited. The RF transmitter 136 is used for transmitting information from the active RFID tag portion 128 out to the receivers through the antenna 142. The active RFID processor 138 may include a microcontroller with an analogue-digital-converter (ADC). The active RFID processor 138 is used for processing data within the active RFID tag portion 128. Information about the active RFID tag portion 128 may be stored in the active RFID memory portion 140. The active RFID memory portion 140 may include a non-volatile memory, for example an electrically erasable programmable read-only memory (EEPROM). The thermistor 144 allows the Hybrid Tag 104 to double up as a wireless thermometer. The combination of the RF transmitter 136, the active RFID processor 138 and the active RFID memory portion 140 may be termed an active RFID circuit 139. The normally closed reed switch 134 is connected to the active RFID circuit 139, wherein the normally closed reed switch 134 is configured such that when it is subjected to a magnetic field environment, the active RFID circuit 139 is electrically disconnected from the power supply unit 132 and when it is out of the magnetic field environment, the active RFID circuit 139 is electrically connected to the power supply unit 132. In addition, using the thermistor 144 to form a voltage divider, temperature can be calculated from the voltage across the thermistor 144. The ADC of the microcontroller will sample the thermistor 144 periodically to measure the voltage across the thermistor 144 and the microcontroller will calculate the temperature using the measured voltage. The calculated temperature will then be included in the RF data packets.

In relation to the passive RFID tag portion 130, the passive RFID transponder coil 152 may be a weakly coupled transformer, including a transmitter coil and a receiver coil. Signals are transmitted from the transmitter coil to the receiver coil by magnetic induction. One purpose of the passive RFID transponder coil 152 is to transmit and receive signals by magnetic induction means. The analog front end 150 is responsible for converting analog signals received by the passive RFID transponder coil 152 into digital data and converting the digital data into analog signal. The passive RFID processor 148 is used for processing data within the passive RFID tag portion 130. The passive RFID processor 148 will have a predetermined logic of when and what to receive and transmit. Information about the passive RFID tag portion 130 may be stored in the passive RFID memory portion 146. Like the active RFID memory portion 140, the passive RFID memory portion 146 may include a non-volatile memory, for example an EEPROM.

In one embodiment, an implementation of an effective RFID location tracking system often involves a plurality of RFID tag assemblies 104, each of which includes an active RFID tag portion 128 and a passive RFID tag portion 130. An active RFID tag portion 128 or an active RFID tag is battery powered and operates on radiative coupling. Information is transmitted using low frequency (LF), high frequency (HF) or ultra-high frequency (UHF). A passive RFID tag portion 130 or passive RFID tag derives its power from a RFID tag reader 106 and operates on inductive coupling. The information is passed back to the RFID tag reader 106 by modulating the carrier signal from the RFID tag reader 106.

In one embodiment, off-the-shelf passive RFID tags 130 complying with international standards, for example EPC-global standards, are used with an active RFID tag 128. One passive RFID tag 130 and one active RFID tag 128 may be placed in a single casing, to form a single RFID tag assembly 104, which is also termed a "Hybrid Tag" 104.

In one embodiment, each of the passive 130 and active 128 RFID tags of the Hybrid Tag 104 has their own unique IDs and the passive 130 and active 128 RFID tags are not electronically connected or are electrically isolated.

In one embodiment, to reduce complexity for an user, only one ID, either the passive RFID tag ID or active RFID tag ID, is used.

In one embodiment, the active RFID tag ID of the active RFID tag 128 is stored in the active RFID memory portion 140 of the active RFID tag 128 and also in the passive RFID memory portion 146 of the passive RFID tag 130. The storing of the active RFID tag ID on the passive RFID memory portion 146 of the passive RFID tag 130 is done during production. When the Hybrid Tag 104 is read by a passive RFID tag reader 106, IDs of the active RFID tag 128 and passive RFID tag 130 will be captured by the passive RFID reader 106. The passive RFID tag reader 106 will then send the passive RFID reader ID, the passive RFID tag ID and the active RFID tag ID through the system network to the controller server 122 and stored in the database server 124. The software in the application server 126 will only make use of the active RFID tag ID while ignoring the passive RFID tag ID. From the user's point of view, the Hybrid Tag 104 will only display one ID, which is that of the active RFID tag 128. In addition, the passive RFID reader ID is associated with at least one location ID.

In one embodiment, the active RFID memory portion 140 of the active RFID tag 128 will store the passive RFID ID instead. A data packet sent by the active RFID tag 128 will contain the active RFID tag ID and the passive RFID tag ID. Upon receiving the data packet by the SmartNODEs 110 or SRRs 108, the data packet will be transmitted through the network to the controller server 122 and stored in the database server 124. Only the passive RFID tag ID will be used, therefore to the user, only the passive RFID tag ID exists.

In one embodiment, a usage of a normally closed reed switch 134 with an active RFID tag portion 128 or in a Hybrid Tag is provided. The use of a normally closed reed switch 134 with an active RFID tag portion 128 or in the Hybrid Tag 104 can help to conserve the available power. Using the Hybrid Tag 104 as an example, as the Hybrid Tag 104 is passing through a gantry that has a magnetic field, the normally closed reed switch 134 will open and cause the active RFID circuit 139 of the Hybrid Tag 104 to be electrically disconnected from the power supply unit 132. After the Hybrid Tag 104 has passed the gantry and is out of the magnetic field, the normally closed reed switch 134 will return to its normally closed state thus being electrically connected to the power supply unit 132. Upon powering up, the Power On Reset bit of the microcontroller of the active RFID portion 128 will be set. This caused to active RFID tag portion 128 to continuously send gantry data packet within a fixed period of time after which the Power On Reset bit will be cleared.

The above mentioned gantry data packet contains the Hybrid Tag ID and the gantry data packet is defined to indicate that the Hybrid Tag 104 has just passed through gantry. When the SmartNODEs 110 and SRRs 108 received the gantry data packets, the SmartNODEs 110 and SRRs 108 will append their ID in the data packet and send it to the controller server 122. The system will then associate the Hybrid Tag ID with the SRR ID or SmartNODE ID, which in turn is associated with a location. With the location known and an indication that the Hybrid Tag 104 has passed through gantry, the system can then indicate that the Hybrid Tag 104 has passed through gantry of that location.

In one embodiment, the normally closed magnetic reed switch 134 can also be used for registration. When a Hybrid Tag 104 is placed in a storage case with a magnetic field, the normally closed magnetic reed switch 134 will open and the active RFID circuit 139 will be electrically disconnected from the power supply unit 132. When the Hybrid Tag 104 is removed from the storage case, the normally closed magnetic reed switch 134 will return to its normally closed state, thus being electrically connected to the active RFID circuit 139. Upon powering up, the Power On Reset bit of microcontroller of the active RFID portion 128 will be set. This caused the Hybrid Tag 104 to continuously send registration data packets within a fixed period of time after which the Power On Reset bit will be cleared. The system upon receiving the registration packet will indicate that the mentioned Hybrid Tag 104 has been switched on.

In one embodiment, the RFID tag assembly 104 include only an active RFID tag portion 128. The active RFID tag portion 128 includes a power supply unit 132, a normally closed reed switch 134, a RF transmitter 136, an active RFID processor 138, an active RFID memory portion 140, an antenna 142 and a thermistor 144. The combination of the RF transmitter 136, the active RFID processor 138 and the active RFID memory portion 140 may be termed an active RFID circuit 139 as described previously. The normally closed reed switch 134 is connected to the active RFID circuit 139, wherein the normally closed reed switch 134 is configured such that when it is subjected to a magnetic field environment, the active RFID circuit 139 is electrically disconnected from the power supply unit 132 and when it is out of the magnetic field environment, the radio frequency identification circuit 139 is electrically connected to the power supply unit 132.

Figure 3:
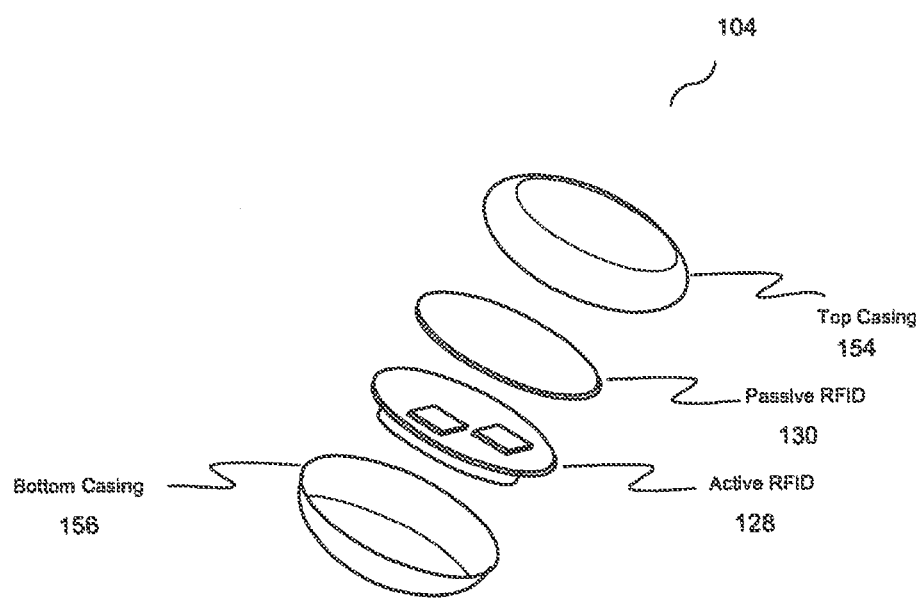
FIG. 3 shows an exploded view of a radio frequency identification tag assembly according to one embodiment of the present invention.

FIG. 3 shows an exploded view of a radio frequency identification tag assembly according to one embodiment of the present invention. The RFID tag assembly 104 includes a top casing 154, a passive RFID tag portion 130, an active RFID tag portion 128 and a bottom casing 156. The top casing 154 and the bottom casing 156 may be made of a suitable material for example Acrylonitrile Butadiene Styrene (ABS). The top casing 154 and the bottom casing 156 may be brought together to form a waterproof casing for housing the passive 130 and active 128 RFID tag portions. The passive RFID tag portion 130 and the active RFID tag portion 128 are as described previously in FIG. 2

FIG. 4 show respective front and back views of a radio frequency identification tag assembly according to one embodiment of the present invention. The top or front casing 154 includes a LED window 260 and a window 262 for barcode or serial number label. The LED window 260 is to indicate to a user that the tag assembly is active. The bottom or back casing 156 includes a slot 264 for placing a wrist strap which in turn is secured to a subject's wrist like a watch and an infrared (IR) window 266. In one embodiment, the RFID tag assembly 104 has an IR transceiver. The IR window 266 allows the RFID tag assembly 104 to be configured through IR communication.

FIG. 5 show respective front and back views of a radio frequency identification tag assembly according to a further embodiment of the present invention. The top or front casing 154 includes a LED window 260 and a window 262 for barcode or serial number label. The LED window 260 is to indicate to a user that the tag assembly is active. The bottom or back casing 156 includes a metal contact 268 for a thermistor and an infrared (IR) window 266. In one embodiment, the RFID tag assembly 104 has a IR transceiver. The IR window 266 allows the RFID tag assembly 104 to be configured through IR communication. The thermistor is in thermal contact with the metal contact 268 and the metal contact 268 is in turn in thermal contact with the subject (for example the patient's skin). The thermistor will measure the temperature of the metal contact 268 and as the metal contact 268 is a good conductor of heat, the measured temperature is the substantially the same as the skin temperature.

Figure 6:
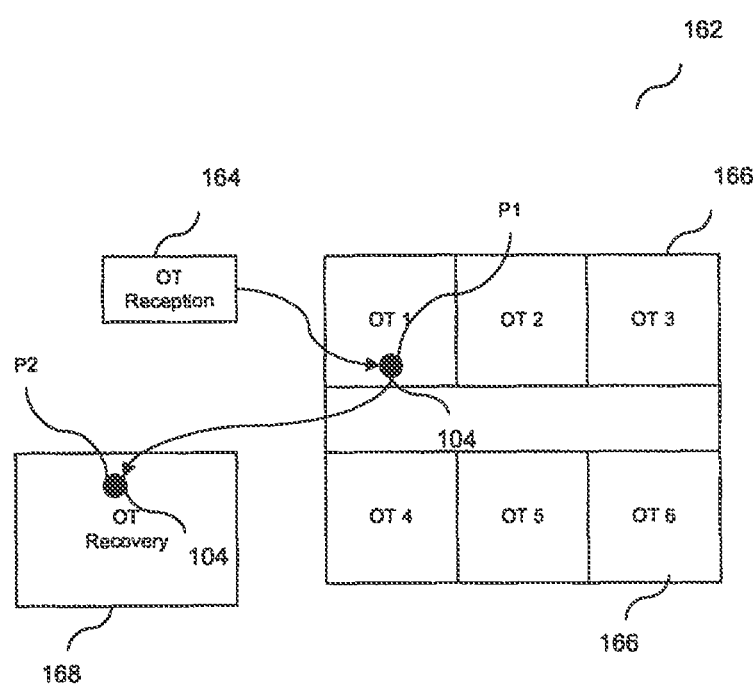
FIG. 6 shows an example of implementation of a radio frequency identification tag assembly in an operating theatre (OT) complex according to one embodiment of the present invention.

FIG. 6 shows an example of implementation of a radio frequency identification tag assembly in an operating theatre (OT) complex according to one embodiment of the present invention. The OT complex 162 includes an OT reception 164, a plurality of OTs 166 and an OT recovery 168. In one embodiment, the passive RFID tag portion 130 of the Hybrid Tag 104 incorporated in the work flow of the OT complex 162 can provide pinpoint location of the patient. When a patient first arrives at the OT reception 164, the patient's details such as personal particulars and scheduled surgery are verified. When the patient is wheeled into his designated OT 166, in the above example OT 1, the patient's Hybrid Tag 104 will be scanned with a first passive RFID reader, P 1. The RFID reader P 1 will send a data packet containing a Hybrid Tag ID, a RFID reader ID and a command to disable the active RFID tag portion 128 tracking for this Hybrid Tag ID. At the same time, the location will be updated as the one associated with the RFID reader, P1.

During the time when the active RFID tag portion 128 tracking of the Hybrid Tag 104 is disabled, the location of the Hybrid Tag 104 will be associated with the last known location, which is the one relating to the passive RFID reader used to read the Hybrid Tag 104.

After the operation, the patient will be transferred to the OT recovery 168. The patient's Hybrid Tag 104 will be scanned again with a second passive RFID reader, P2. This time round, the Hybrid Tag ID, the RFID reader ID and a command to enable the active RFID tag portion 128 tracking for the Hybrid Tag 104 and the SmartTRAC algorithm will be used for active RFID tag portion 128 tracking again. The example of implementation of a radio frequency identification tag assembly may also be carried out in any suitable buildings or premises.

Figure 7:
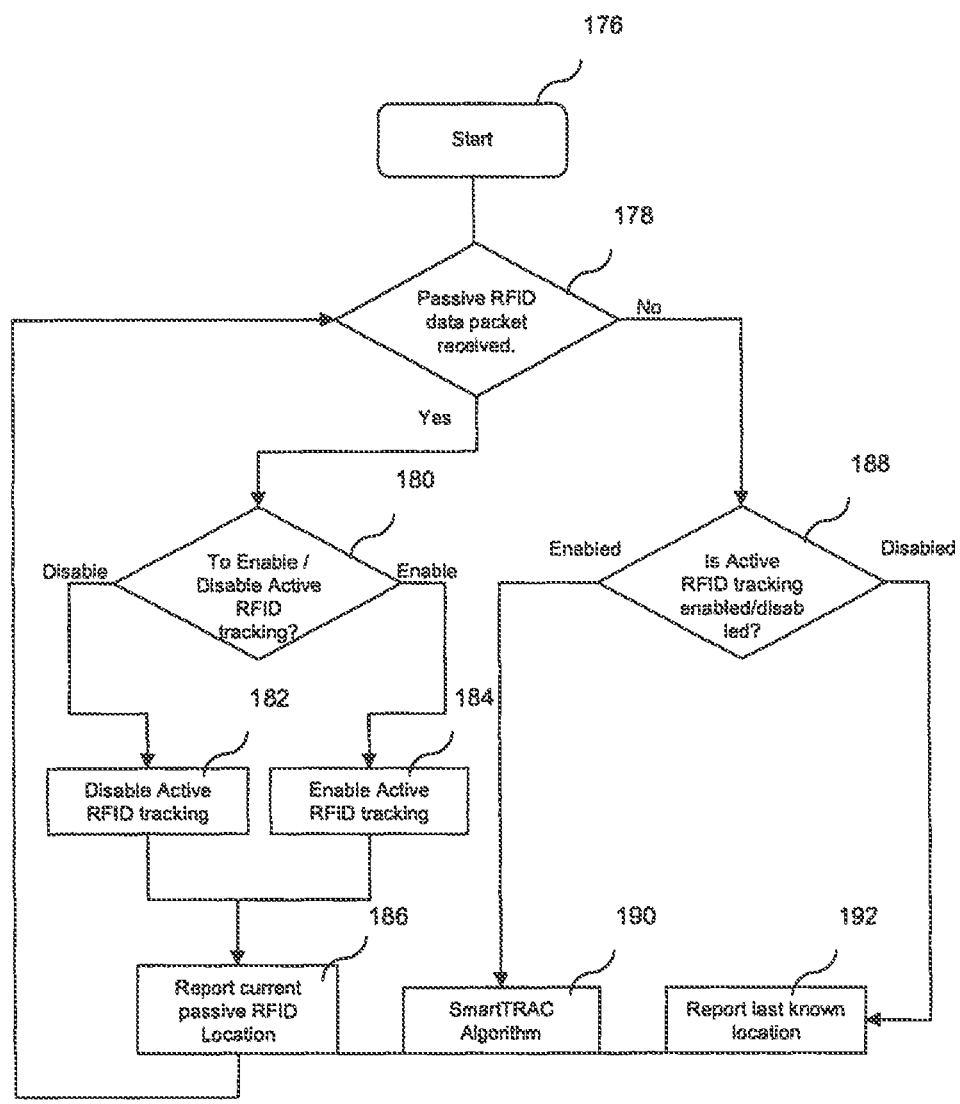
FIG. 7 shows a flowchart of the example of implementation of a radio frequency identification tag assembly in an operating complex as shown in FIG. 6 according to one embodiment of the present invention.

FIG. 7 shows a flowchart of the example of implementation of a radio frequency identification tag assembly in an operating complex as shown in FIG. 6 according to one embodiment of the present invention.

The implementation begins in step 176. In step 176, the Hybrid Tag 104 is issued to a patient and a method of tracking a location identity of the patient may be executed.

Next in step 178, it is determined whether a passive RFID data packet is received. The passive RFID data packet sent by a passive RFID reader contains a passive ID, an active ID of a Hybrid Tag 104 and a command to inform the system on whether to enable or disable active RFID tag portion 128 tracking for the particular Hybrid Tag 104. If it is determined in step 178 that a passive RFID data packet is received, the processing proceeds to step 180, where it is determined whether to enable or disable the active RFID tag portion 128 tracking.

If it is determined that the active RFID tag portion 128 tracking is to be disabled, the processing proceeds to step 182, where the active RFID tag portion tracking is disabled. If it is determined that the active RFID tag portion 128 tracking is to be enabled, the processing proceeds to step 184, where the active RFID tag portion tracking is enabled.

Following steps 182 and 184, the processing proceeds to step 186 where the location of the current passive RFID tag portion 130 is reported.

Following step 186, the processing proceeds back to step 178 where it is again determined whether a passive RFID data packet is received. If it is determined in step 178 that a passive RFID data packet is not received, the processing proceeds to step 188, where it is determined whether the active RFID tag portion 128 tracking is enabled or disabled.

If it is determined that the active RFID tag portion 128 tracking is enabled, the processing proceeds to step 190 where the SmartTRAC algorithm is activated. If it is determined that the active RFID tag portion 128 tracking is disabled, the processing proceeds to step 192 where the last known location is reported.

Following steps 190 and 192, the processing proceeds back to step 178 again.

Figure 8:
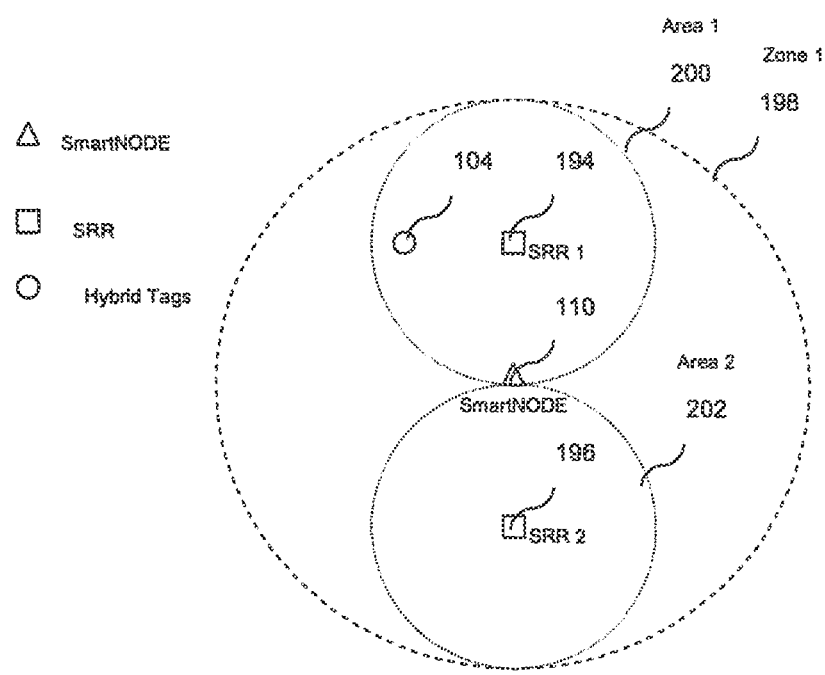
FIG. 8 shows respective interrogation zones of a coarse localization receiver and a fine localization receiver according to one embodiment of the present invention.

FIG. 8 shows respective interrogation zones of a coarse localization receiver and a fine localization receiver according to one embodiment of the present invention. The coarse localization receiver or SmartNODE 110, has a relatively wide coverage area or localization zone 198 and each coarse localization receiver 110 is used to provide a coarse localization of the Hybrid Tag 104. The fine localization receivers or SRRs 194, 196 have respective smaller coverage areas or localization zones 200, 202 as compared to the SmartNODE 110. Therefore, the respective SRRs 194, 196 will provide a finer localization of the Hybrid Tag 104.

In FIG. 8, a Hybrid Tag 104 is positioned within Area 1, 200. The SmartNODE 110 provides a coarse localization of the Hybrid Tag 104 as the coverage area (also termed localization zone) of the SmartNODE 110 is larger when compared to the respective coverage areas of the SRR1, 194 and SRR2, 196. The SmartNODE 110 has a large area of coverage, Zone 1, 198, of about 10 meters radius. The SRRs 194, 196 have respective small area of coverage, Area 1, 200 and Area 2, 202, of around 5 meters radius. Since the area of coverage is small, the SRRs 194, 196 will only receive data packets if the Hybrid Tags 104 is in close proximity with the SRRs 194, 196. Upon receiving a data packet from the Hybrid Tag 104, SRR 1, 194 will add its ID to the received data packet and rebroadcast the amended data packet. The rebroadcasted data packet is meant for the SmartNODE 110. The SmartNODE 110 upon receiving the rebroadcast message sends it to the controller server 122. The system will then associate the Hybrid Tag ID with the SRR1 ID which in turn is associated with Area 1, 200. With that, the location of the Hybrid Tag 104 is identified to be within Area 1, 200.

In one embodiment, the SmartNODE 110 is a radio frequency (RF) receiver. It is responsible for receiving data packets from the Hybrid Tags 104 and SRRs 194, 196. The received data is relayed to the controller server 122 through a LAN. Each SmartNODE 110 will have its own unique ID.

In one embodiment, the SmartNODEs 110 are distributed in the area where the SmartSense Location Tracking System is implemented. The system will have a list of areas and each area will be given a location ID. Each SmartNODE 110 will be assigned with at least one location ID. Therefore, a group of SmartNODEs 110 will represent a location.

When a SmartNODE 110 receives a data packet from a Hybrid Tag 104, it will append its ID to the data packet, then send it to the controller server 122. With the Hybrid Tag ID and SmartNODE ID, the system can associate the Hybrid Tag ID with the location ID assigned to the SmartNODE ID. By associating the location ID to the Hybrid Tag ID, the location of the Hybrid Tag 104 may be identified.

The SRRs 194, 196 complements the SmartNODEs 110 by providing additional data for the SmartTRAC algorithm to compute a more accurate location of the Hybrid Tags 104. Each of the SRRs 194, 196 will have a unique ID and will be associated with a location ID.

In one embodiment, each of the SRRs 194, 196 consist of a RF receiver, a RF transmitter and a microcontroller. The RF receiver is responsible for receiving RF data packets from the Hybrid Tags 104, the microcontroller will then append the SRR ID to the data packet and rebroadcast the data packet to SmartNODEs 110 through the RF transmitter.

The SRRs' receiver has a smaller reception range or coverage area compared to the SmartNODEs 110. The RF transmitter has a higher transmission power compared to the Hybrid Tags 104. Therefore, the SRR 108 has a small reception range and a high transmission range.

In one embodiment, the coverage range of each SRR's receiver portion can be adjusted by varying a lower signal strength threshold and an upper signal strength threshold. A signal below the lower signal strength threshold will be regarded as outside of the SRR's reception range while a signal above the upper signal strength threshold will be within the SRR's reception range or coverage.

In an example of a first implementation, a SRR in general is equipped with a receiver with a signal strength indication. Based on the signal strength indication, the SRR can choose to reject and accept data packets based on the lower and higher signal strength threshold.

The lower and upper signal strength threshold values can be determined through experimental methods. A SRR can be set up in the desired deployment settings. A transmitting Hybrid Tag can be placed at a designated distance away from the SRR. The signal strength at different distances are respectively determined. For example, a SRR is placed in a reference position and a Hybrid Tag is placed about 2 meters away from the SRR. The signal strength for each data packet is logged for a period of about 15 minutes. After about 15 minutes, the average signal strength at about 2 meters is calculated. After which, the distance may be increased to about 4 meters and the signal strength for each data packet is logged for a period of about 15 minutes. Again the average signal strength value at about 4 meters is calculated. This process will continue until a distance of about 10 meters for example is reached. A larger sample size of Hybrid Tags can also be used for better estimation of signal strength at various distances.

The signal strength of a Hybrid Tag is an indication of how far the Hybrid Tag is from the SRR. The lower and upper threshold values for SRR receiver portion can be set at various values as desired. If a deployment of the SRR requires it to be very accurate in pinpointing a Hybrid Tag, the upper and lower signal threshold values can then be set to a high value (for example, within 2 meters range) which allows the SRR to detect Hybrid Tag within a small proximity. In another deployment where a wide area of coverage is preferred so as to minimize the number of SRR required, the range can be set to the minimum lower and upper signal threshold values.

In another implementation, the SRR signal strength threshold value for the receiver portion may be changed through the hardware configurations. The sensitivity of the receiver is reduced thereby increasing the lower and upper signal strength threshold values.

In one embodiment, the lower and upper signal strength threshold values need not be distinct and may be substantially the same.

In the above mentioned implementation, the RF receiver of the SRR may consist of a lossy antenna. The lossy antenna is implemented by adjusting passive impedance matching components to a non resonant value. Also the antenna design of the receiver can be changed to make it less sensitive. For example, change in antenna size, change in antenna length, change in antenna shape. Also a RF attenuator can be added to the antenna of the receiver to increase the threshold of signal levels. An advantage of the RF attenuator design over the lossy antenna design is that the RF attenuator reduces the amplitude or power of a signal without appreciably distorting its waveform.

Figure 9:
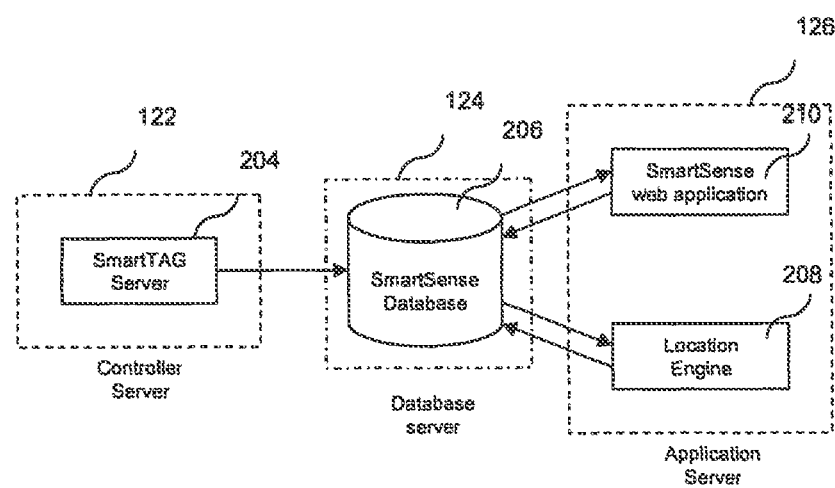
FIG. 9 shows a software architecture of a method of tracking a location identity of a subject according to one embodiment of the present invention.

FIG. 9 shows a software architecture of a method of tracking a location identity of a subject according to one embodiment of the present invention. A SmartTAG server application 204 resides in the Controller Server 122, and it is responsible for collecting data packets received by the SmartNODEs 110 and stores the data packets into a SmartSense Database 206. The SmartSense Database 206 is found in the Database Server 124. A Location Engine 208 is found in the Application Server 126 and it is responsible for interpreting and processing the data packets stored in the SmartSense database 206 and returns the computed location results back to the SmartSense Database 206. The Location Engine 208 uses the SmartTRAC algorithm to compute the location results. The SmartSense web application 210 which is also found in the Application Server 126 displays the location results for users.

Figure 10A:
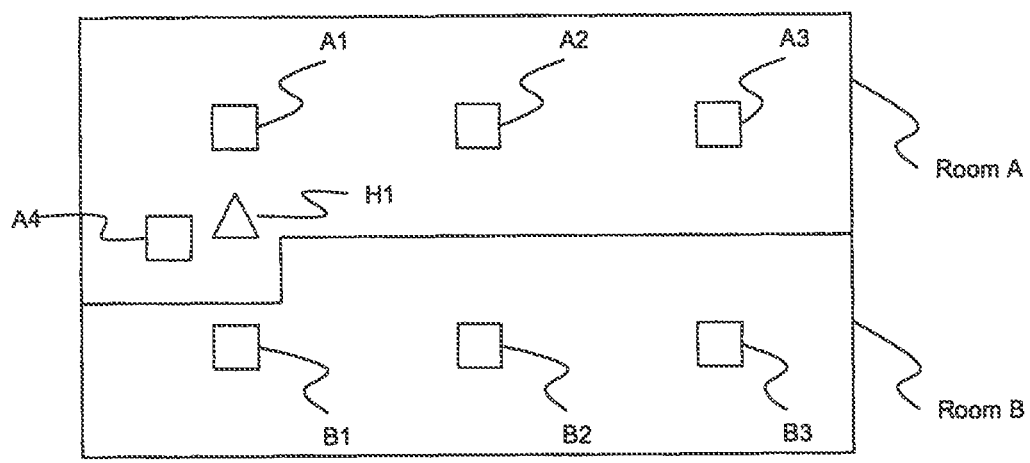
FIG. 10A to 10G show respective scenarios of a method of tracking a location identity of a subject according to one embodiment of the present invention.

FIG. 10A to 10G show respective scenarios of a method of tracking a location identity of a subject according to one embodiment of the present invention. FIG. 10A shows a simplified setup of the SmartSense system. Room A includes an installation of three SmartNODEs, namely A1, A2 & A3 and a SRR, namely A4 and Room B includes an installation of three SmartNODEs, namely B1, B2 & B3. A subject or person wearing a Hybrid Tag (H1) is situated in room A as shown in FIG. 10A.

Figure 10B:
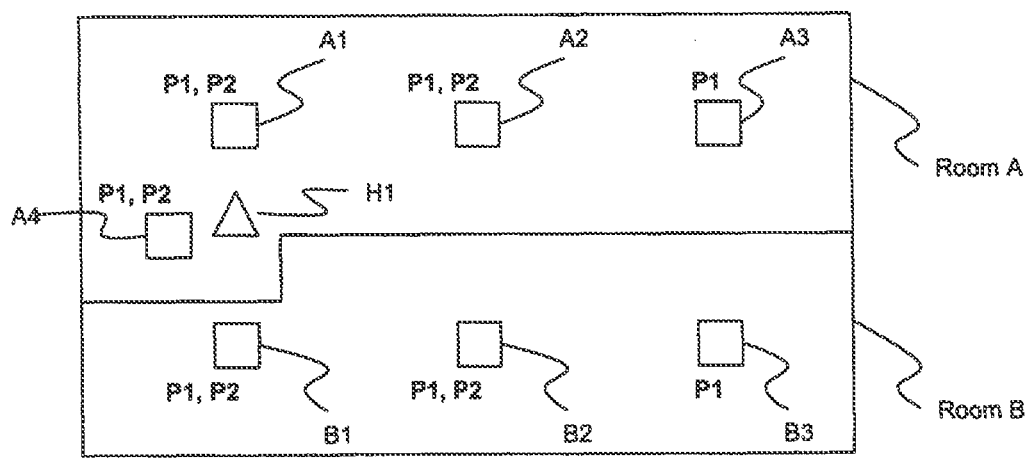

FIG. 10B illustrates the data packets received by the respective SmartNODEs and SRR. In the first minute, H1 transmit a Strong signal data packet (P1) and the data packet is received by A1, A2, A3, A4, B1, B2 and B3. In the second minute, H1 transmit a Weak signal data packet (P2) which is received by A1, A2, A4, B1 and B2. A1, A2, A4, B1, B2 receive the Strong signal data packet P1 and the Weak signal data packet P2. A3 and B3 only receives the Strong signal data packet P1.

Each type of data packet may have a different weightage. For example, the Strong signal data packet will have a low weightage and the Weak signal data packet will have a high weightage. P1 is a Strong signal data packet and P1 will have a weight of $\lambda=1$ and P2 is a Weak signal data packet and P2 will have a weight of $\lambda=2$.

For each SmartNODE or SRR, a score N, will be calculated based on the data packets they received.

$$N = \sum_{j=1}^{m} \lambda_j$$

Where
N=score for SmartNODE or SRR,
m=Number of data packets received by the SmartNODE or SRR,
$\lambda$=Weight for each of the data packet.

Figure 10C:
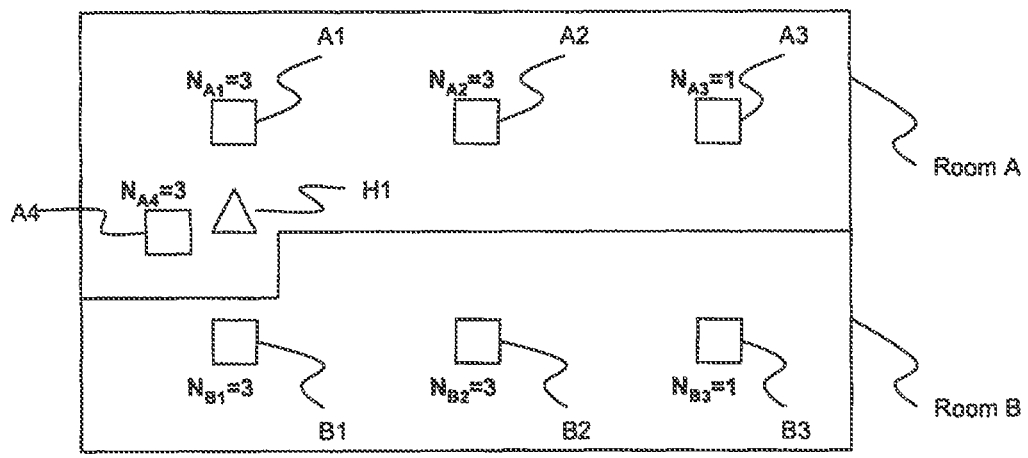

FIG. 10C shows the score for respective SmartNODEs and SRR. A1 received both P1 and P2, therefore, score N for A1 is 3. A2, A4, B1 and B2 will have the same score as A1 because they too received P1 and P2.

$$N_{A1} = \sum_{j=1}^{2} \lambda_j$$

$$N_{A1} = \lambda_{P1} + \lambda_{P2}$$

$$N_{A2} = N_{A4} = N_{B1} = N_{B2} = N_{A1} = 1 + 2 = 3$$

A3 and B3 receive only P1, the score N for each of A3 and B3 is 1.

$$N_{A3} = \sum_{j=1}^{1} \lambda_j$$

$$N_{A3} = \lambda_{P1}$$

$$N_{B3} = N_{A3} = 1$$

Each SmartNODE. and SRR has a factor $\beta$ for each location. $\beta$ will take into the account the projected location of the tracked subject and also the profile of which SmartNODEs and SRRs will receive data packets from the tracked subject at a given position.

In one embodiment, factor $\beta$ can also consider projected movement based on the location history of the person or object. The projected movement will consider factors like direction of movement, speed of movement and the layout of the area the person or object is in. Using the one or more of the factors, it is possible to predict where the person or object is located next and therefore assigning more weights to the SmartNODEs and SRRs in the projected location.

Figure 10D:
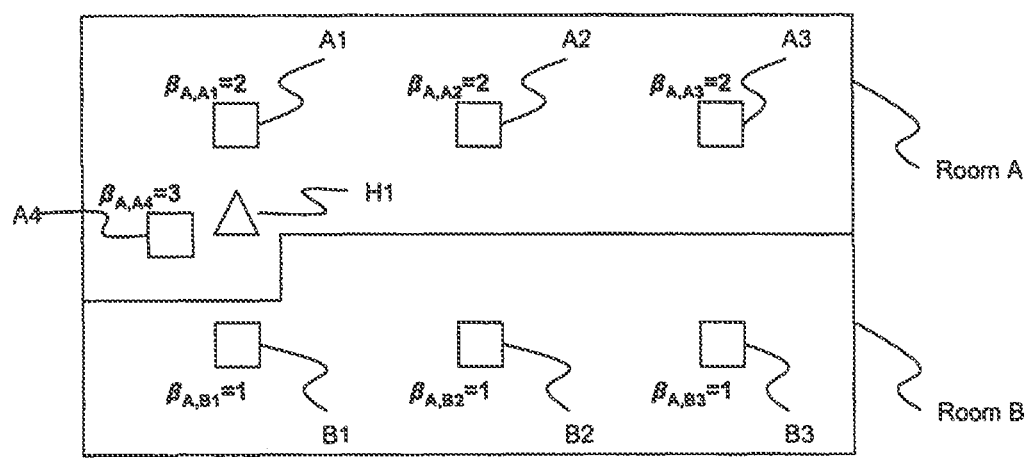

FIG. 10D shows the factor $\beta$ of all the SmartNODEs and SRRs for Room A. The factor $\beta$ for A1, A2 and A3 is 2, for A4 is 3 and for B 1, B2 and B3 is 1 respectively.

Figure 10E:
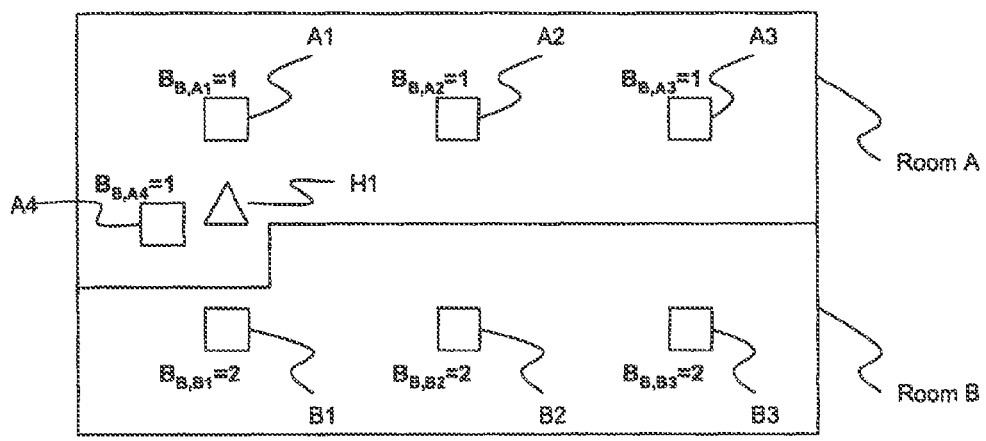

FIG. 10E shows the factor $\beta$ of all the SmartNODEs and SRRs for Room B. The factor $\beta$ for A1, A2, A3 and A4 is 1, and for B 1, B2 and B3 is 2 respectively.

After respective N and $\beta$ for all SmartNODEs and SRRs are computed, a score L, will be computed for each location. L for each location can be found by summing the product of N and $\beta$.

$$L = \sum_{1}^{n} \beta_i N_i$$

Where n=total number of SmartNODEs and SRRs in the tracked area.

Figure 10F:
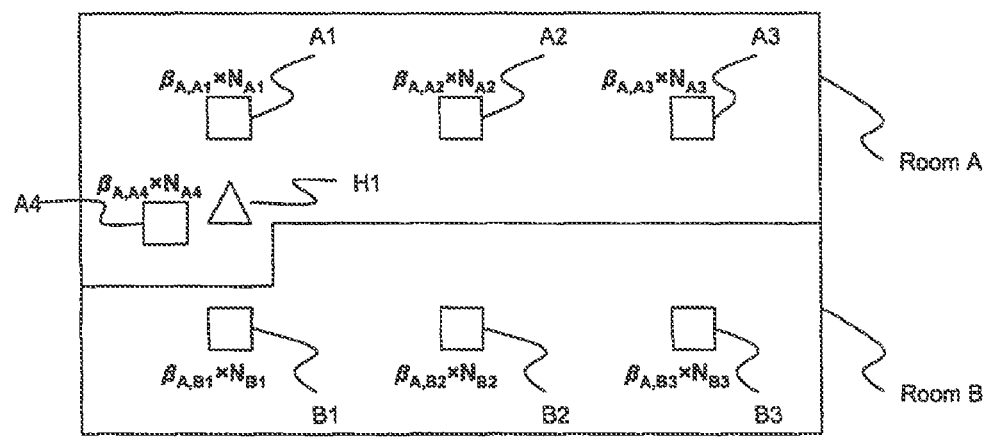

FIG. 10F shows the computation of the score L for room A.

Figure 10G:
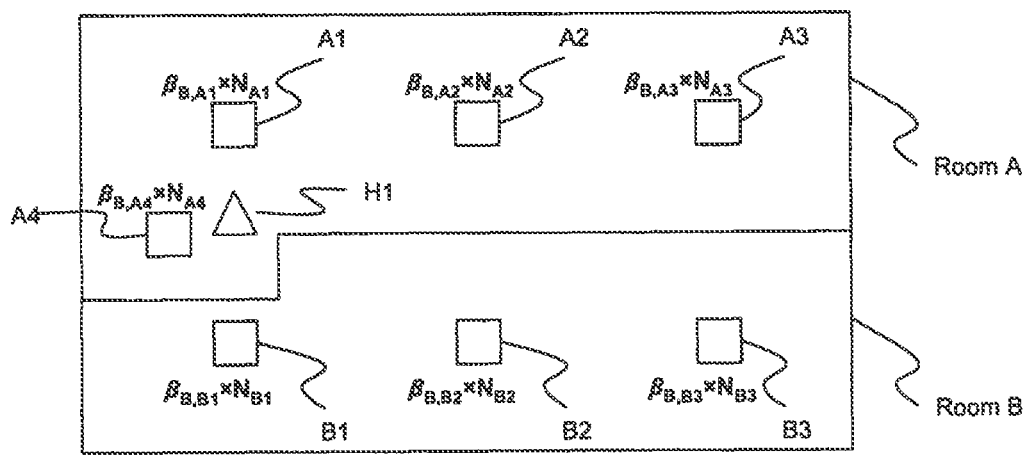

$L_A = \beta_{A,A1}N_{A1} + \beta_{A,A2}N_{A2} + \beta_{A,A3}N_{A3} + \beta_{A,A4}N_{A4} + \beta_{A,B1}N_{B1} + \beta_{A,B2}N_{B2} + \beta_{A,B3}N_{B3} = (2 \times 3) + (2 \times 3) + (2 \times 1) + (3 \times 3) + (1 \times 3) + (1 \times 3) + (1 \times 1) = 30$ FIG. 10G shows the computation of the score L for room B.

$L_B = \beta_{B,A1}N_{A1} + \beta_{B,A2}N_{A2} + \beta_{B,A3}N_{A3} + \beta_{B,A4}N_{A4} + \beta_{B,B1}N_{B1} + \beta_{B,B2}N_{B2} + \beta_{B,B3}N_{B3} = (1 \times 3) + (1 \times 3) + (1 \times 1) + (1 \times 3) + (2 \times 3) + (2 \times 3) + (2 \times 1) = 24$ The location with the highest score for L, will be the location of Hybrid Tag. In the above example, Room A has the higher score of 30, therefore the Hybrid Tag is in Room A.

If there is a tie in the highest score between 2 or more locations, all the locations will be considered to be potential locations and the decision will be made by reviewing the previous location in the location table of the Hybrid Tag. If the previous location is found in the list of potential locations then current location will be identified as the previous location in the table of the Hybrid Tag. If the previous location is not in the list of potential locations then the first location in the list of potential locations will be updated in the Hybrid Tag's table.

FIG. 11 shows a flowchart of a method of tracking a location identity of a subject according to one embodiment of the present invention. The method of tracking a location identity may be termed the "SmartTRAC" algorithm. The method of tracking a location identity begins in step 218.

Next in step 220, it is determined whether or not a predefined time interval is up. In this embodiment, the time interval is predefined to be 2 minutes but it is not so limited. If it is determined that the 2 minutes time interval is up, the processing proceeds to step 222 where all records within the 2 minutes time interval are selected. On the other hand, if it is determined that the 2 minutes time interval is not up, the processing continuously checks if the 2 minutes time interval is up.

After step 222, the processing proceeds to step 224, where the score N is computed for each SmartNODE or SRR. Following this in step 226, for each location, N is multiplied with the appropriate weights, $\beta$, for each SmartNODE or SRR.

Next in step 228, the score L is computed based on the total number of SmartNODE and/or SRR for each location.

Then in step 230, it is determined whether there is only one highest score for L. If it is determined that there is only one highest score L for a particular location, the processing proceeds to step 232, where the location is reported. However, if it is determined that there is not only a single highest score L, the processing proceeds to step 234, where the location history of the Hybrid Tag is checked.

Then the processing proceeds to step 232, where the location is reported.

Figure 12A:
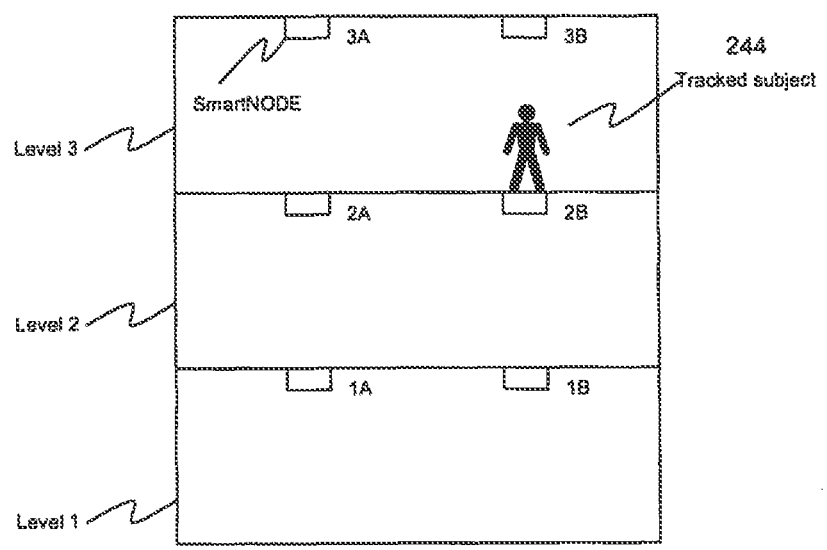
FIG. 12A to 12E show a method of tracking a location identity of a subject including associating each location identity with a predetermined group of receivers according to one embodiment of the present invention.

FIG. 12A to 12E show a method of tracking a location identity of a subject including associating each location identity with a predetermined group of receivers according to one embodiment of the present invention. FIG. 12A shows an example of a three storey building with two SmartNODEs installed on each level. SmartNODEs 3A and 3B are installed on level 3, SmartNODEs 2A and 2B are installed on level 2 and SmartNODEs 1A and 1B are installed on level 1. A tracked subject 244 is positioned on level 3 and nearer to SmartNODE 3B.

Figure 12B:
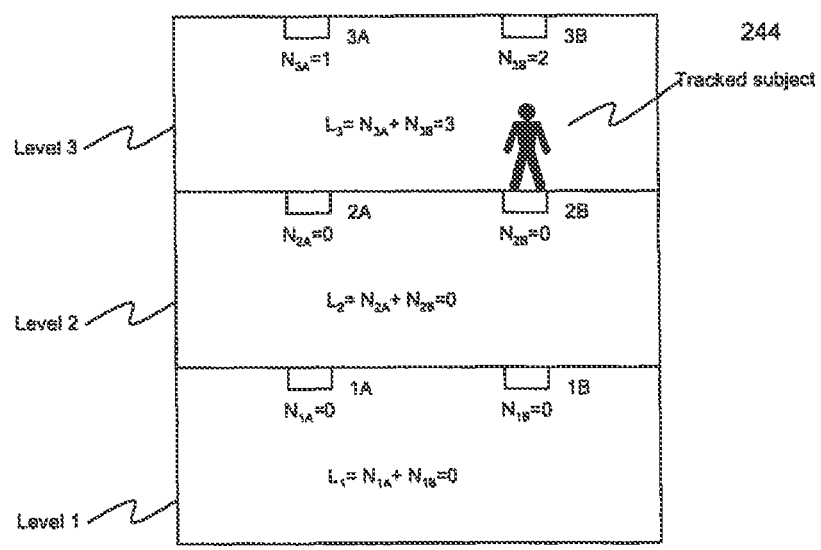

In FIG. 12B, it is assumed that each SmartNODE will only receive data packets within its level. Therefore the algorithm involves identifying which SmartNODEs receive the data packets and identifying the location in which the SmartNODEs is associated to. In FIG. 12B, on level 3, SmartNODEs $N_{3A}$ and $N_{3B}$ receive data packets from the tracked subject 244. $N_{3A}$ is equal to 1 and $N_{3B}$ is equal to 2. The score $L_3$ for level 3 is the sum of $N_{3A}$ and $N_{3B}$, which is equal to 3. On level 2, $N_{2A}$ and $N_{2B}$ are respectively equal to 0. Therefore, the score $L_2$ for level 2 is the sum of $N_{2A}$ and $N_{2B}$, which is equal to 0. Similarly on level 1, $N_{1A}$ and $N_{1B}$ are respectively equal to 0. Therefore, the score $L_1$ for level 1 is the sum of $N_{1A}$ and $N_{1B}$, which is also equal to 0. By comparing the score L amongst the three levels, $L_3$ has the highest score of 3. Therefore, the tracked subject 244 can be identified to be on level 3.

FIG. 12B shows an example of an ideal situation. However, in an actual implementation, data packets may be received by other levels too. This occurs when SmartNODEs are mounted on high ceilings, thereby the distance between the Hybrid Tag and the lower level SmartNODEs is much shorter than the distance between the Hybrid Tag and the SmartNODEs found on the same level. Often, the lower level SmartNODEs may receive more data packets.

Figure 12C:
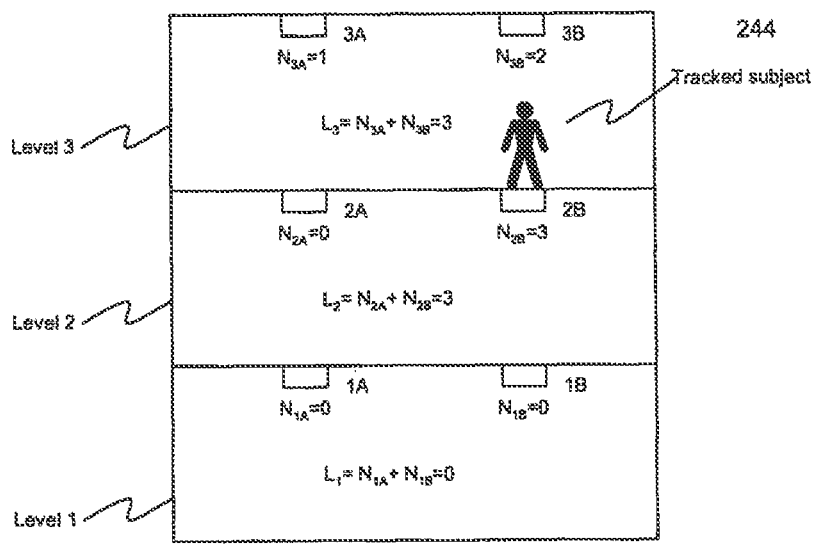

In FIG. 12C, for example considering the same setup with SmartNODE 3A and 3B also receiving 1 and 2 data packets respectively, but this time SmartNODE 2B receives 3 data packets. $L_3$ for level 3 is 3, $L_2$ for level 2 is 3 and $L_1$ for level 1 is 0. In this regard, summing up the total number of data packets received by each level is not useful as the total score L for level 3, $L_3$, and for level 2, $L_2$, is the same. If the previous algorithm is adopted, there will be a decision to be made on whether the subject is found in level 3 or 2 as both levels have the same total score L.

Figure 12D:
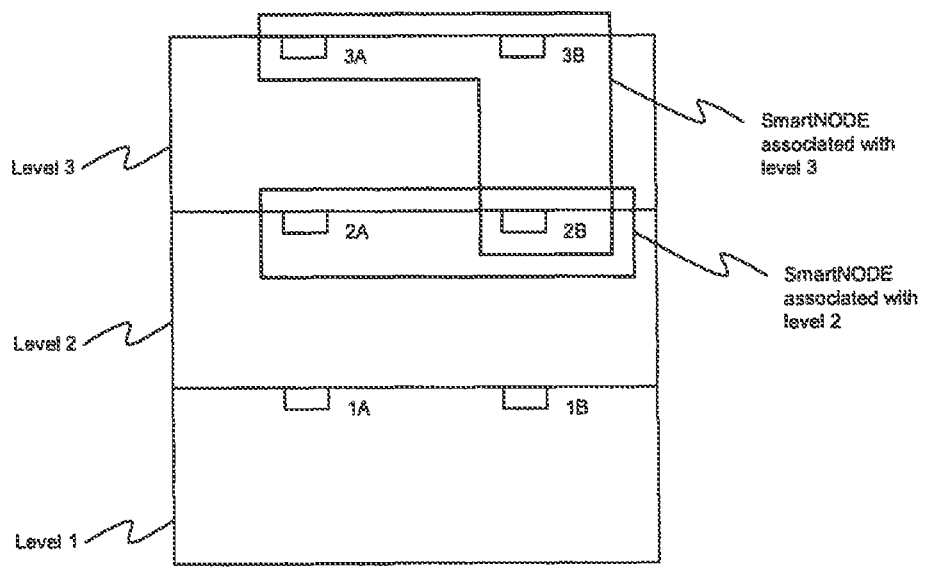

Therefore, a logical grouping instead of physical grouping of the SmartNODEs is introduced in FIG. 12D. From site surveys, it can be determined that when a subject is located at the above position as previously indicated, SmartNODE 2B is consistently receiving the data packets. Therefore, the SmartNODEs associated with level 3 will be 3A, 3B and 2B while the SmartNODEs associated with level 2 is 2A and 2B.

Figure 12E:
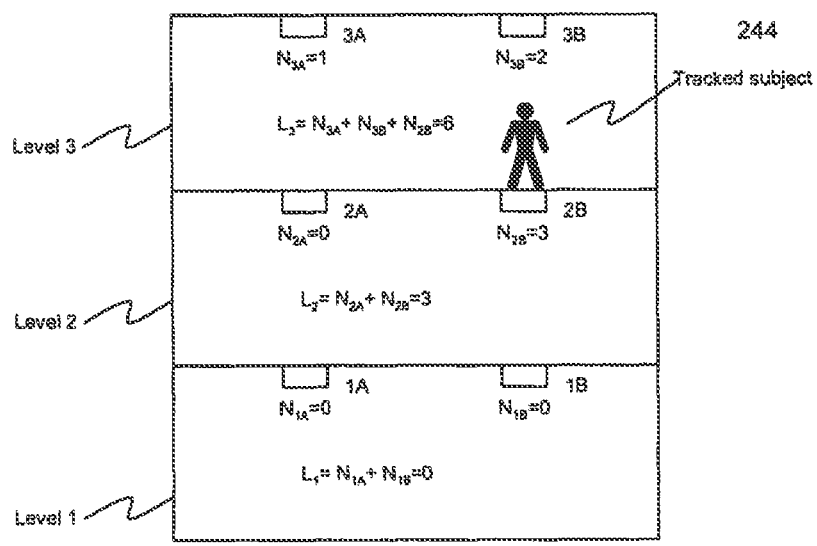

Having established the association, the algorithm involves the summing up the number data packets received by each SmartNODE for each location in FIG. 12E. The location with the highest score L will be the location of the tracked subject 244. From FIG. 12E, level 3 has a $L_3$ score of 6, level 2 has a $L_2$ score of 3 and level 1 has a $L_1$ score of 0. Therefore, the subject is located in level 3.

Figure 13A:
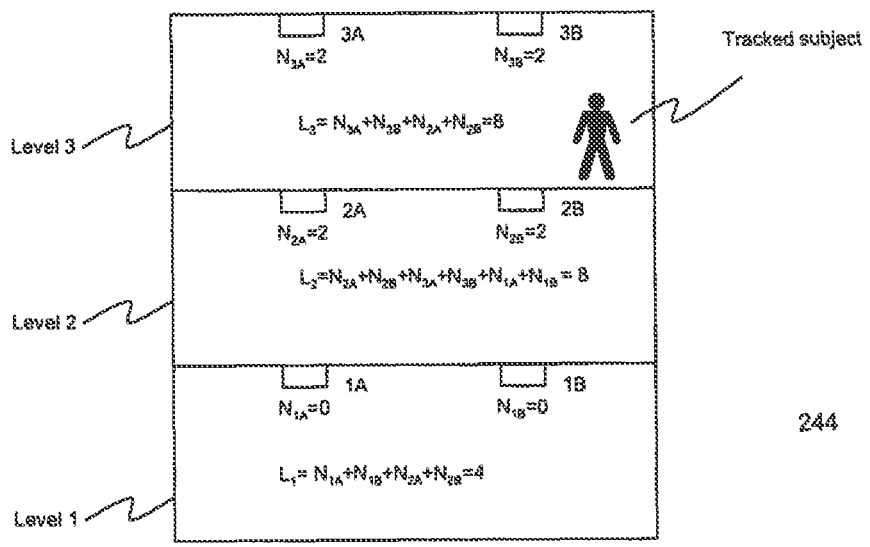
FIG. 13A to 13B show a method of tracking a location identity of a subject including assigning a weightage based on a receiver type of a receiver according to one embodiment of the present invention.
Figure 13B:
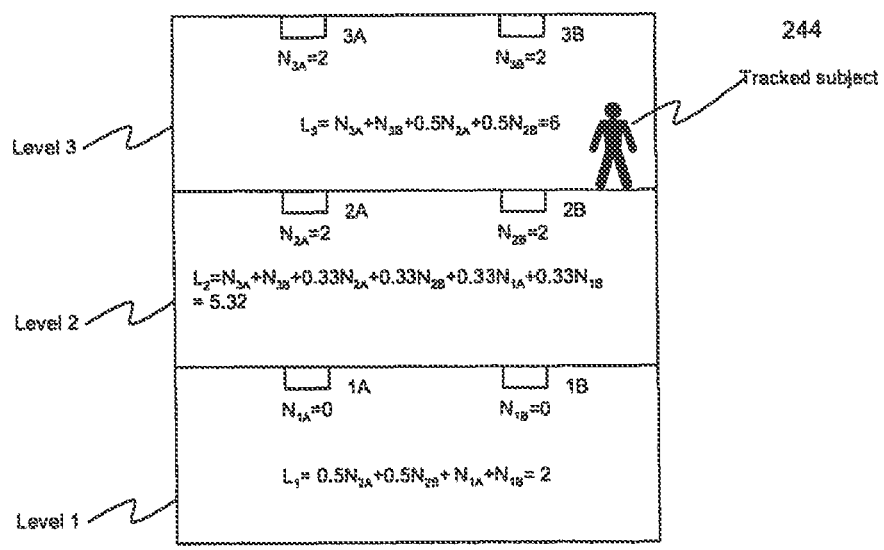

FIG. 13A to 13B show a method of tracking a location identity of a subject including assigning a weightage based on a receiver type of a receiver according to one embodiment of the present invention. The above algorithm can be made more generic by introducing weights on each SmartNODE for each location. The benefit of introducing weightage to the SmartNODE is illustrated by contrasting FIG. 13A and FIG. 13B.

FIG. 13A and FIG. 13B respectively show an example of a three storey building with two SmartNODEs installed on each level. SmartNODEs 3A and 3B are installed on level 3, SmartNODEs 2A and 2B are installed on level 2 and SmartNODEs IA and 113 are installed on level 1. A tracked subject 244 is positioned on level 3 and nearer to SmartNODE 3B.

In FIG. 13A, on level 3, $N_{3A}$ and $N_{3B}$ are respectively equal to 2. On level 2, $N_{2A}$ and $N_{2B}$ are also respectively equal to 2. On level 1, $N_{1A}$ and $N_{1B}$ are respectively equal to 0. The score $L_3$ for level 3 is the sum of $N_{3A}$, $N_{3B}$, $N_{2A}$ and $N_{2B}$ which is equal to 8. The score $L_2$ for level 2 is the sum of $N_{3A}$, $N_{3B}$, $N_{2A}$, $N_{2B}$, $N_{1A}$ and $N_{1B}$, which is also equal to 8. The score $L_1$ for level 1 is the sum of $N_{2A}$, $N_{2B}$, $N_{1A}$ and $N_{1B}$, which is equal to 4. By comparing the score L amongst the three levels, $L_3$ and $L_2$ have the same score of 8. Therefore, it would be difficult to identify the subject in FIG. 13A.

In FIG. 13B, weightage have been assigned based on the receiver type of the receiver. On level 3, $N_{3A}$ and $N_{3B}$ are respectively equal to 2. On level 2, $N_{2A}$ and $N_{2B}$ are also respectively equal to 2. On level 1, $N_{1A}$ and $N_{1B}$ are respectively equal to 0. The score $L_3$ for level 3 is the sum of $N_{3A}$, $N_{3B}$, $0.5N_{2A}$ and $0.5N_{2B}$ which is equal to 6. The score $L_2$ for level 2 is the sum of $N_{3A}$, $N_{3B}$, $0.33N_{2A}$, $0.33N_{2B}$, $0.33N_{1A}$ and $0.33N_{1B}$, which is equal to 5.32. The score $L_1$ for level 1 is the sum of $0.5N_{2A}$, $0.5N_{2B}$, $N_{1A}$ and $N_{1B}$, which is equal to 2. By comparing the score L amongst the three levels, $L_3$ has the highest score of 6. Therefore, it would be possible to identify the subject in FIG. 13B.

Figure 14A:
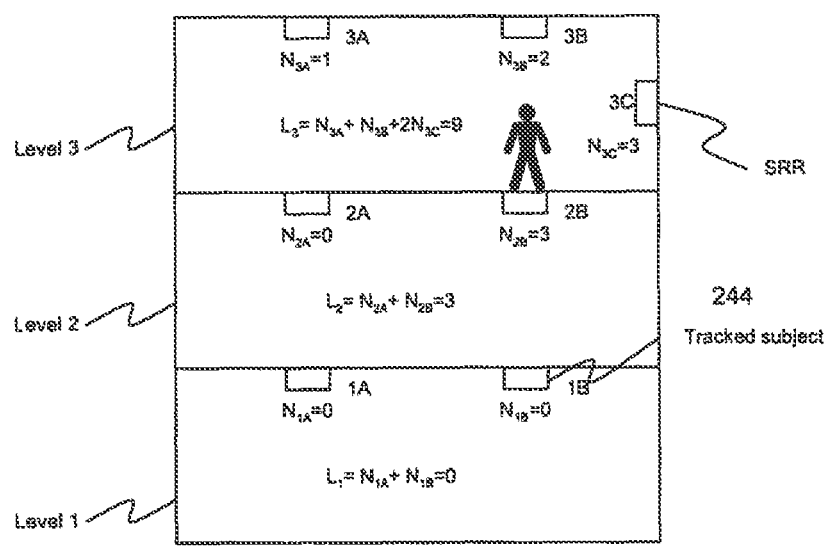
FIG. 14A to 14B show possible uses of a fine localization receiver according to one embodiment of the present invention.
Figure 14B:
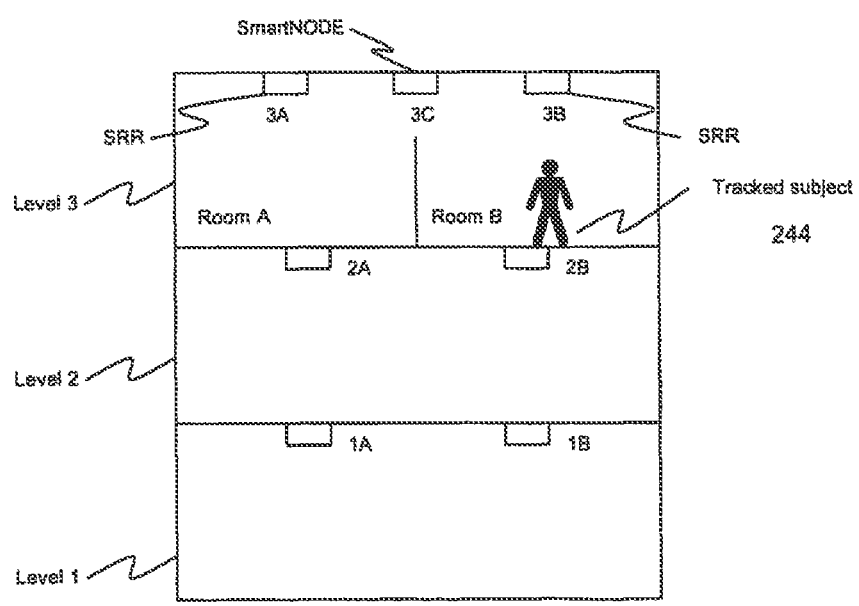

FIG. 14A to 14B show possible uses of a fine localization receiver according to one embodiment of the present invention. One use of a fine localization receiver or SRR is to provide a higher accuracy of the location of the subject. This is due to the fact that SRR has a very short reception range, therefore data packets transmitted from another level will not be received by the SRR.

FIG. 14A shows that two SmartNODEs 3A and 3B, and one SRR 3C are installed on level 3, two SmartNODEs 2A and 2B are installed on level 2 and two SmartNODEs 1A and 1B are installed on level 1.

The score N, based on the number of data packets each SmartNODE or SRR on level 3 received are $N_{3A}=1$, $N_{3B}=2$ and $N_{3C}=3$ respectively. The score N, based on the number of data packets each SmartNODE on level 2 received are $N_{2A}=0$ and $N_{2B}=3$ respectively. The score N, based on the number of data packets each SmartNODE on level 1 received are $N_{1A}=0$ and $N_{1B}=0$ respectively.

As the SRR has a very short reception range, data packet transmitted from another level will not be received by the SRR. Therefore, higher weightage is assigned to the SRR as compared to the SmartNODE. SRR 3C will have a higher weightage of 2 compared to a weightage of 1 for SmartNODEs 3A and 3B. Therefore, the score $L_3$ for level 3 is 9. The SmartNODEs 2A, 2B have a respective weightage of 1. Therefore, the score $L_2$ for level 2 is 3. The SmartNODEs 1A and 1B have a respective weightage of 1. Therefore, the score $L_1$ for level 1 is 0. As $L_3$ has the highest score, the subject 244 is in level 3.

Another use of a SRR is to further segment an area. In one embodiment as shown in FIG. 14B, level 3 can be further divided by a partition into two rooms, namely room A and room B. A first SRR 3A can be positioned in room A and a second SRR 3B can be positioned in room B. A SmartNODE 3C can be positioned between room A and room B. As the SRRs 3A and 3B have a small reception range, the SRRs 3A and 3B will only cover their respective room. The SmartNODE 3C is required for the SRRs 3A and 3B to upload their data packet to a controller server. As the subject 244 is located in room B, only the SRR 3B will be able to receive the data packets from the Hybrid Tag of the subject.

Figure 15A:
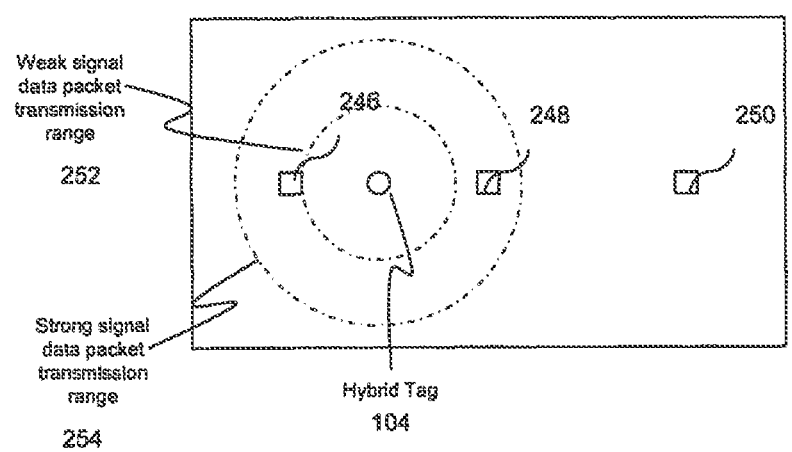
FIGS. 15A and 15B show effects of using weak and strong signal data packets on localization according to one embodiment of the present invention.
Figure 15B:
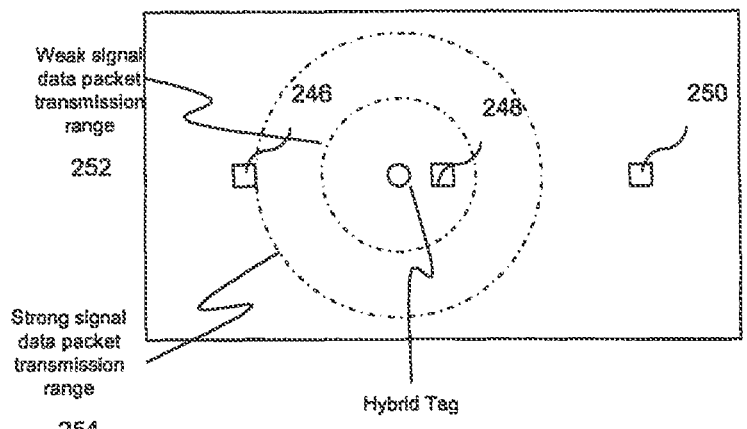

FIG. 15A and FIG. 15B show effects of using weak and strong signal data packets on localization according to one embodiment of the present invention. The weak and strong signal data packets enable the SmartSense system to achieve a better localization without a sacrifice in the coverage range. FIG. 15A and FIG. 15B illustrate how the weak and strong signal data packets compliment each other. If only the weak signal data packet is used, there may be a situation that the signal may not reach any SmartNODEs. To overcome blind spots, more SmartNODEs must be deployed to provide better coverage. On the other hand, a strong signal data packet may bring about cross level transmission.

FIGS. 15A and 15B show a plurality of SmartNODEs 246, 248 and 250 positioned spaced apart from each other. FIG. 15A shows a Hybrid Tag 104 positioned between SmartNODEs 246 and SmartNODE 248, at a relatively equidistance away from each of the SmartNODE 246 and SmartNODE 248. The Hybrid Tag 104 has a weak signal data packet transmission range denoted by a small circle 252 and a strong signal data packet transmission range denoted by a bigger circle 254. FIG. 15A shows that if only the weak signal data packet is transmitted, the signal may not reach any of the SmartNODE 246 or SmartNODE 248. And when the strong signal data packet is transmitted, both the SmartNODE 246 and SMartNODE 248 receive the signal, thereby resulting in cross-level or cross-area transmission.

FIG. 15B shows a Hybrid Tag positioned between SmartNODE 246 and SmartNODE 248, nearer to SmartNODE 248. Similar to FIG. 15A, the Hybrid Tag 104 has a weak signal data packet transmission range denoted by a small circle 252 and a strong signal data packet transmission range denoted by a bigger circle 254. Unlike FIG. 15A, FIG. 15B shows if only the weak signal data packet is transmitted, the signal reaches the SmartNODE 248. And when the strong signal data packet is transmitted, the SmartNODE 248 also receives the signal. This is unlike the situation in FIG. 15A as the Hybrid Tag 104 is positioned nearer to the SmartNODE 248. Therefore to prevent the situation where the signal may not reach any SmartNODE or to prevent cross-level or cross-area transmission, more SmartNODEs may be deployed in order to provide a better coverage.

Figure 16A:
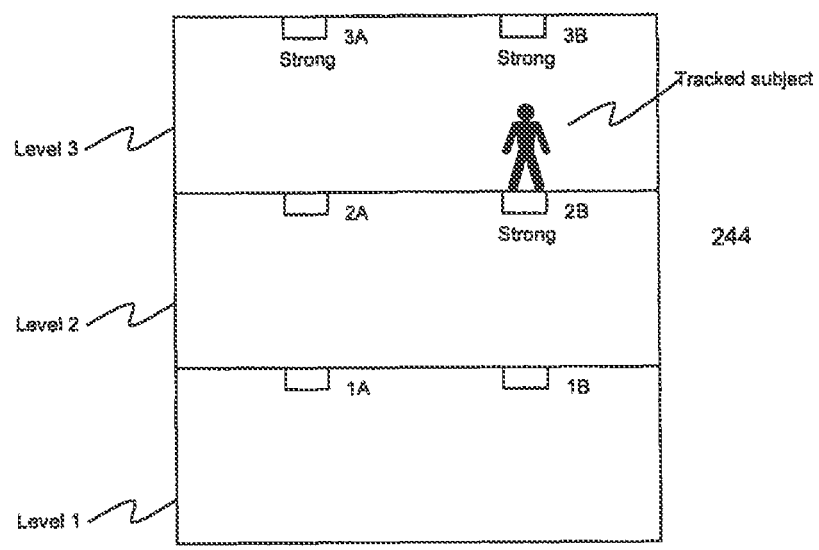
FIG. 16A to 16C show respective scenarios of a method of tracking a location identity of a subject including assigning a weightage based on a data type according to one embodiment of the present invention.
Figure 16B:
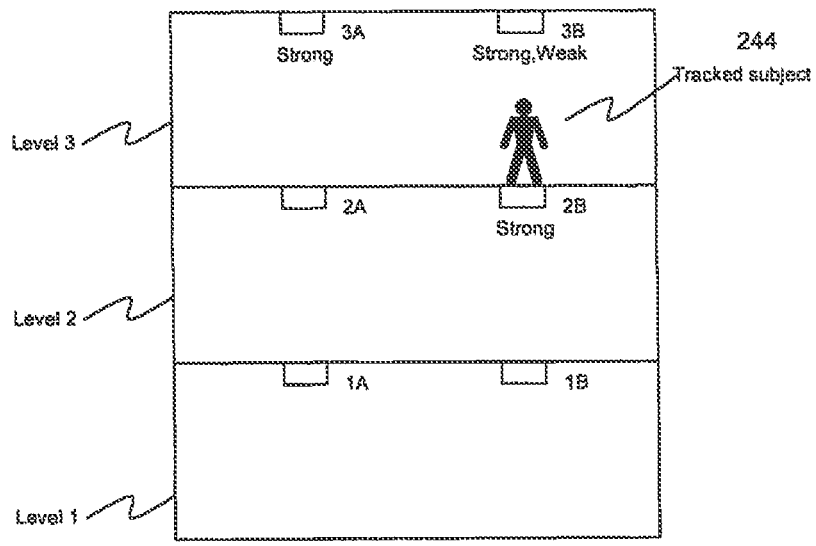
Figure 16C:
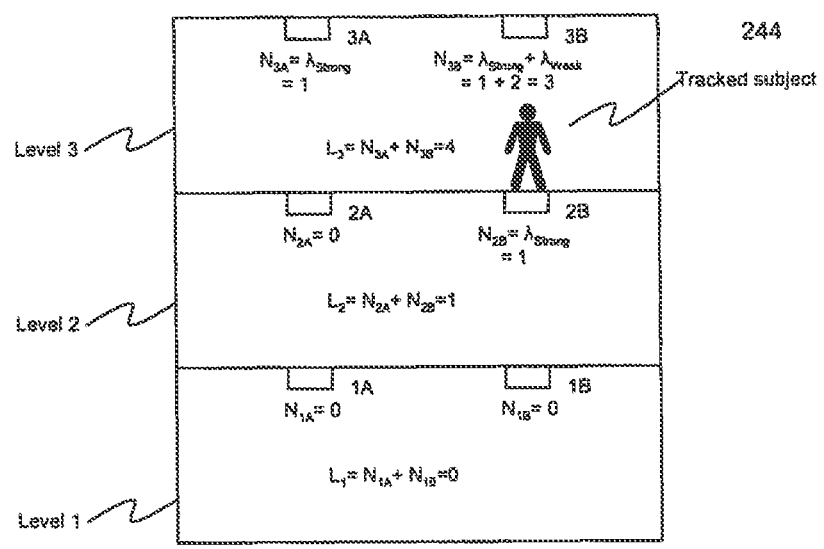

FIG. 16A to 16C show respective scenarios of a method of tracking a location identity of a subject including assigning a weightage based on a data type according to one embodiment of the present invention.

FIG. 16A shows a three storey building with two SmartNODEs installed on each level. SmartNODEs 3A and 3B are installed on level 3, SmartNODEs 2A and 2B are installed on level 2 and SmartNODEs 1A and 1B are installed on level 1. A tracked subject 244 with the Hybrid Tag is positioned on level 3, nearer to SmartNODE 3B.

The Hybrid Tag from the tracked subject 244 first transmits a strong signal data packet. The SmartNODEs 3A, 3B and 2B receive the Strong signal data packet as shown in FIG. 16A.

After transmitting the strong signal data packet, the Hybrid Tag transmits a weak signal data packet. The weak signal data packet is only received by SmartNODE 3B as shown in FIG. 16B.

As the possibility of a Hybrid Tag being in an interrogation zone of a SmartNODE receiving the weak signal data packet is higher than another interrogation zone of another SmartNODE receiving the strong signal data packet, a higher weightage will be given to the weak signal data packet while a lower weightage will be given to the strong signal data packet.

In FIG. 16C, $\lambda_{Strong}$ is equal to 1 and $\lambda_{weak}$ is equal to 2. The score N for each SmartNODE is calculated by summing all the weights of the data packets it received. On level 3, for SmartNODE 3A, $N_{3A}$ is equal to $\lambda_{Strong}$, which is equal to 1. For SmartNODE 3B, $N_{3B}$ is equal to the sum of $\lambda_{Strong}$ and $\lambda_{weak}$ which is equal to 3. On level 2, for SmartNODE 2A, $N_{2A}$ is equal to 0 and for SmartNODE 2B, $N_{2A}$ is equal to $\lambda_{Strong}$, which is equal to 1. On level 1, for SmartNODE 1A, $N_{1A}$ is equal to 0 and for SmartNODE 1B, $N_{1B}$ is equal to 0.

Then the score L for each level is calculated by summing the score N of each level and the level with the highest score for L will be the location of the tracked subject 244. In FIG. 16C, the score $L_3$ for level 3 is the sum of $N_{3A}$ and $N_{3B}$, which is equal to 4. The score $L_2$ for level 2 is the sum of $N_{2A}$ and $N_{2B}$, which is equal to 1. The score $L_1$ for level 1 is the sum of $N_{1A}$ and $N_{1B}$, which is equal to 0. Therefore, the tracked subject 244 is in level 3 as $L_3$ has a highest score of 4.

In the following description, further aspects of embodiments of the present invention will be explained.

According to one embodiment of the present invention, determining the location of the subject based on the location score includes determining if the location score is unique.

According to one embodiment of the present invention, the method further includes checking a location history of the radio frequency identification tag if there is no unique location score.

According to one embodiment of the present invention, the method further includes receiving, by the first set of receivers out of a plurality of receivers, the second signal from the radio frequency identification tag.

According to one embodiment of the present invention, the method further include receiving, by the second set of receivers out of a plurality of receivers, the first signal from the radio frequency identification tag.

According to one embodiment of the present invention, each of the first set of receivers includes a first interrogation zone and each of the second set of receivers includes a second interrogation zone.

According to one embodiment of the present invention, the first interrogation zone is smaller than the second interrogation zone.

According to one embodiment of the present invention, the method further includes collecting the first signal and/or the second signal received by the second set of receivers in a controller server within a pre-defined time interval.

According to one embodiment of the present invention, the method further includes storing the received signal in a database server.

According to one embodiment of the present invention, the method further includes processing the stored signal in an application server and saving the processed signal in the database server.

According to one embodiment of the present invention, the method further includes associating each location with a predetermined set of receivers out of a plurality of receivers.

According to one embodiment of the present invention, computing a location score includes computing a location score further based on a projected movement of the subject.

According to one embodiment of the present invention, the projected movement of the subject is dependent on at least one item selected from a group consisting of location history of the subject, direction of movement, speed of movement and layout of the location.

According to one embodiment of the present invention, the first signal includes a signal above a first predetermined threshold value.

According to one embodiment of the present invention, the second signal includes a signal below a second predetermined threshold value.

According to one embodiment of the present invention, the second predetermined threshold value is lower than the first predetermined threshold value.

According to one embodiment of the present invention, the second predetermined threshold value is at least substantially the same as the first predetermined threshold value.

According to one embodiment of the present invention, the determining unit being further configured to determine, if the location score is unique.

According to one embodiment of the present invention, the system further includes a checking unit for checking a location history of the radio frequency identification tag if there is no unique location score.

According to one embodiment of the present invention, the first set of receivers out of a plurality of receivers further receive the second signal from the radio frequency identification tag.

According to one embodiment of the present invention, the second set of receivers out of a plurality of receivers further receive the first signal from the radio frequency identification tag.

According to one embodiment of the present invention, each of the first set of receivers includes a first interrogation zone and each of the second set of receivers includes a second interrogation zone.

According to one embodiment of the present invention, the first interrogation zone is smaller than the second interrogation zone.

According to one embodiment of the present invention, the system further includes a controller server connected to the second set of receivers, the controller server collecting the first signal and/or the second signal received by the second set of receivers within a pre-defined time interval.

According to one embodiment of the present invention, the system further includes a database server connected to the controller server, the database server storing the received signal.

According to one embodiment of the present invention, the system further includes an application server connected to the database server, the application server processing the stored signal.

According to one embodiment of the present invention, the system further includes an associating unit for associating each location with a predetermined set of receivers out of a plurality of receivers.

According to one embodiment of the present invention, the computing unit being further configured to compute a location score further based on a projected movement of the subject.

According to one embodiment of the present invention, the projected movement of the subject is dependent on at least one item selected from a group consisting of location history of the subject, direction of movement, speed of movement and layout of the location.

According to one embodiment of the present invention, the first signal includes a signal above a first predetermined threshold value.

According to one embodiment of the present invention, the second signal includes a signal below a second predetermined threshold value.

According to one embodiment of the present invention, the second predetermined threshold value is lower than the first predetermined threshold value.

According to one embodiment of the present invention, the second predetermined threshold value is at least substantially the same as the first predetermined threshold value.

According to one embodiment of the present invention, the first set of receivers is in communication with the second set of receivers via radio frequency means.

According to one embodiment of the present invention, the second set of receivers is in communication with the controller server via a communication network.

According to one embodiment of the present invention, the first tag further comprising a first tag memory portion.

According to one embodiment of the present invention, the first tag identity is stored in the first tag memory portion.

According to one embodiment of the present invention, the first tag and the second tag are electrically isolated from each other.

According to one embodiment of the present invention, the second tag memory portion of the second tag is a non-volatile memory.

According to one embodiment of the present invention, the first tag memory portion of the first tag is a non-volatile memory.

According to one embodiment of the present invention, the first tag is an active radio frequency identification tag and the second tag is a passive radio frequency identification tag.

According to one embodiment of the present invention, the first tag is a passive radio frequency identification tag and the second tag is an active radio frequency identification tag.

According to one embodiment of the present invention, the active radio frequency identification tag further comprises a thermistor.

According to one embodiment of the present invention, the active radio frequency identification tag further includes a radio frequency identification circuit; and a normally closed switch connected to the radio frequency identification circuit, wherein the normally closed switch is configured such that when it is subjected to a magnetic field environment, the radio frequency identification circuit is electrically disconnected from a power supply and when it is out of the magnetic field environment, the radio frequency identification circuit is electrically connected to the power supply.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio frequency identification tag assembly comprising a first tag, the first tag comprising a first tag identity; and a second tag, the second tag comprising a second tag identity and a second tag memory portion;
   wherein the first tag identity and the second tag identity are stored in the second tag memory portion of the second tag;
   wherein the first tag is an active radio frequency identification tag and the second tag is a passive radio frequency identification tag, or wherein the first tag is a passive radio frequency identification tag and the second tag is an active radio frequency identification tag; and
   wherein the active radio frequency identification tag further comprises a radio frequency identification circuit and a normally closed switch connected to the radio frequency identification circuit, wherein the normally closed switch is configured such that when it is subjected to a magnetic field environment, the radio frequency identification circuit is electrically disconnected from a power supply and when it is out of the magnetic field environment, the radio frequency identification circuit is electrically connected to the power supply.

2. The radio frequency identification tag assembly according to claim 1, wherein the first tag further comprises a first tag memory portion.

3. The radio frequency identification tag assembly according to claim 2, wherein the first tag identity is stored in the first tag memory portion.

4. The radio frequency identification tag assembly according to claim 1, wherein the first tag and the second tag are electrically isolated from each other.

5. The radio frequency identification tag assembly according to claim 1, wherein the second tag memory portion of the second tag is a non-volatile memory.

6. The radio frequency identification tag assembly according to claim 2, wherein the first tag memory portion of the first tag is a non-volatile memory.

7. The radio frequency identification tag assembly according to claim 1, wherein the active radio frequency identification tag further comprises a thermistor.

* * * * *